United States Patent
Mavromichalis et al.

(10) Patent No.: US 12,413,632 B2
(45) Date of Patent: Sep. 9, 2025

(54) INTEGRATING ONLINE AND TELEPHONIC CONFERENCE PLATFORMS AND ENABLING SCREENING OF ATTENDEE QUESTIONS REGARDLESS OF WAY ATTENDEE JOINS

(71) Applicant: Motion Meetings Inc., London (CA)

(72) Inventors: Carl Mavromichalis, London (CA); Konstantinos Mavromichalis, London (GB)

(73) Assignee: Motion Meetings Inc., Toronto (CA)

( * ) Notice: Subject to any disclaimer, the term of this patent is extended or adjusted under 35 U.S.C. 154(b) by 426 days.

(21) Appl. No.: 18/063,944

(22) Filed: Dec. 9, 2022

(65) Prior Publication Data
US 2023/0188581 A1    Jun. 15, 2023

(30) Foreign Application Priority Data
Dec. 14, 2021 (CA) ................ CA 3142130

(51) Int. Cl.
*H04L 65/4038* (2022.01)
*G06F 3/0482* (2013.01)
*H04L 65/401* (2022.01)

(52) U.S. Cl.
CPC ........ *H04L 65/4038* (2013.01); *G06F 3/0482* (2013.01); *H04L 65/4015* (2013.01)

(58) Field of Classification Search
CPC ............. H04L 65/4038; H04L 65/4015; G06F 3/0482
See application file for complete search history.

(56) References Cited

U.S. PATENT DOCUMENTS

| | | |
|---|---|---|
| 6,831,971 B2 | 12/2004 | Wellner et al. |
| 7,885,208 B2 | 2/2011 | Mutikainen et al. |
| 8,266,535 B2 | 9/2012 | Brown et al. |
| 8,385,526 B2 | 2/2013 | Smelyansky et al. |

(Continued)

FOREIGN PATENT DOCUMENTS

| | | |
|---|---|---|
| CN | 112185360 A | 1/2021 |
| EP | 1085774 A2 | 3/2001 |
| EP | 1179913 A1 | 2/2002 |
| EP | 1381237 A2 | 1/2004 |
| EP | 1578128 A1 | 9/2005 |

(Continued)

*Primary Examiner* — Amal S Zenati
(74) *Attorney, Agent, or Firm* — ATMAC Patent Services Ltd.; Andrew T. MacMillan

(57) ABSTRACT

A controller of a virtual conferencing system commands an online conference platform to create an online main conference room associated with a meeting, and commands a telephonic conference platform to create a telephonic main conference room associated with the meeting. The controller further commands at least one of the online and telephonic conference platforms to join the online main conference room and the telephonic main conference room together so audio is passed therebetween to form an integrated main conference room. A similar process is used to create an integrated screener room. The controller stores a question queue identifying both online and telephonic attendees who have questions. Attendees who have an unscreened question are moved into either an online or telephonic part of the integrated screener room depending on the way the attendee joined the meeting. Moderators move both telephonic and online attendees with screened questions into the main conference room.

20 Claims, 16 Drawing Sheets

(56) References Cited

U.S. PATENT DOCUMENTS

| | | |
|---|---|---|
| 8,885,807 B2 | 11/2014 | Oliver et al. |
| 8,917,633 B2 | 12/2014 | Smith et al. |
| 9,001,702 B2 | 4/2015 | Rodman et al. |
| 9,081,485 B1 | 7/2015 | Brown et al. |
| 9,094,524 B2 | 7/2015 | Krishnan et al. |
| 9,100,546 B2 | 8/2015 | Bentley et al. |
| 9,112,981 B2 | 8/2015 | Hyndman et al. |
| 9,537,906 B2 | 1/2017 | Rosenberg et al. |
| 9,560,206 B2 | 1/2017 | Jones et al. |
| 9,571,660 B2 | 2/2017 | Klemm |
| 9,635,065 B1 | 4/2017 | Cordell et al. |
| 9,883,042 B1 | 1/2018 | Brown et al. |
| 9,992,345 B1 | 6/2018 | Cordell et al. |
| 10,432,795 B1 | 10/2019 | Cordell et al. |
| 10,541,824 B2 | 1/2020 | Bader-Natal et al. |
| 10,764,697 B2 | 9/2020 | Sherman et al. |
| 10,841,660 B2 | 11/2020 | Siddique et al. |
| 2010/0124321 A1* | 5/2010 | Alexandrov ............ H04M 3/56 379/202.01 |
| 2016/0294892 A1 | 10/2016 | Hata |
| 2018/0352303 A1* | 12/2018 | Siddique ............ H04L 65/1069 |

FOREIGN PATENT DOCUMENTS

| | | |
|---|---|---|
| EP | 1578129 A1 | 9/2005 |
| EP | 1868347 A2 | 12/2007 |
| EP | 1774781 B1 | 8/2008 |
| EP | 1814290 B1 | 12/2008 |
| EP | 1868363 B1 | 5/2009 |
| EP | 1678935 B1 | 9/2009 |
| EP | 2224716 B1 | 5/2013 |
| EP | 1868348 B1 | 1/2014 |
| EP | 3203701 A1 | 8/2017 |
| EP | 1678951 B1 | 4/2018 |
| EP | 3254279 B1 | 11/2018 |
| EP | 3131256 B1 | 12/2018 |
| EP | 3192240 B1 | 5/2019 |
| EP | 3254453 B1 | 5/2019 |
| GB | 2473886 A | 3/2011 |
| JP | 2003067316 A | 3/2003 |
| WO | 03/075510 A1 | 9/2003 |
| WO | 2004028113 A1 | 4/2004 |
| WO | 2004107118 A2 | 12/2004 |
| WO | 2010002817 A2 | 1/2010 |
| WO | 2015200882 A1 | 12/2015 |
| WO | 2016053477 A1 | 4/2016 |

* cited by examiner

INTEGRATING ONLINE AND TELEPHONIC CONFERENCE PLATFORMS AND ENABLING SCREENING OF ATTENDEE QUESTIONS REGARDLESS OF WAY ATTENDEE JOINS

CROSS-REFERENCE TO RELATED APPLICATIONS

This application claims the benefit of priority of Canadian Patent Application No. 3,142,130 filed Dec. 14, 2021, which is incorporated herein by reference.

BACKGROUND OF THE INVENTION

(1) Field of the Invention

The invention pertains generally to virtual conference systems. More specifically, the invention relates to integrating online and telephony virtual conference platforms to form an integrated virtual conference system and allowing moderators to screen attendee questions regardless which way the attendee joins the meeting.

(2) Description of the Related Art

Telephonic conferencing platforms enabling conferences and meetings between participants in different locations via phone lines are known in the art. Examples of functionality are provided in U.S. Pat. No. 8,385,526 entitled "SYSTEM AND PROCESS FOR MASS TELEPHONY CONFERENCE CALL" and U.S. Pat. No. 8,266,535 entitled "TELEFORUM APPARATUS AND METHOD". An example of a current well-known telephonic conference platform is Telnyx™. One problem with telephonic conferencing systems is they only facilitate telephone-based audio communications and do not allow video chat between conference participants over the Internet.

Online conferencing platforms leverage webcams and the increased bandwidth of the Internet to transfer full audiovisual data between participants. As such, online conferencing platforms are becoming ubiquitous in modern remote-work business and home environments. Examples of some current well-known online conferencing platforms include Jitsi™, Zoom™ Skype™, Teams™, GoToMeeting™, Google Meet™, and Cisco Webex™. However, being designed for different target markets and making use of different underlying technology, online conferencing platforms do not include all the same features of existing telephonic conferencing systems.

In particular, current online conferencing platforms do not include a methodical way to screen participant questions and smoothly allow them to ask the question in their own words. Especially for town hall meetings, annual general meetings (AGMs), and public-facing corporate and government meetings, meeting staff often need to vet questioners and their associated questions in advance, before allowing the participant to actively be seen and heard by other participants in the meeting. This is an important factor for organizations conducting meetings that need to be transparent enough to allow people to ask questions in their own words, yet moderated to filter out potentially risky questions or questioners.

Another problem with typical online conferencing platforms is that they are focused on online participants with high-speed Internet access and do not support telephonic participants as seamlessly as the older telephonic conferencing systems. Although most online platforms do provide dial-in numbers and room codes that can be entered by touch tones, the administration and management of dial-up participants is secondary to the platform. Functions such as parallel and timed out-dialing of participants, automatic redialing, and touch-tone-based inputs for voting and asking questions, to name a few, are typically not supported.

In general, older telephonic conferencing platforms do not support newer features such as video, and certain functionality of existing telephonic conferencing systems such as participant question screening and parallel out-dialing is not currently implemented in online conferencing platforms. It would be beneficial to replicate the full capabilities of both telephonic and online conferencing platforms in a single conferencing system; however, this would involve significant redundant development effort to duplicate all the desired functionality.

BRIEF SUMMARY OF THE INVENTION

According to an exemplary embodiment of the invention there is disclosed a virtual conference platform that combines audio/video with telephony/teleconferencing using a method which creates simultaneous instances of one or more conference rooms on both an online conference platform and a telephonic conference platform in a first step and then combines the corresponding conference rooms on the multiple platforms to form one or more integrated (i.e., joined) conference rooms in a second step.

According to an exemplary embodiment of the invention there is disclosed an integrated, semi-automated participant question queuing and screening process utilizing an integrated question queue that works for participants on both the online and telephonic conferencing platforms. In some exemplary embodiments, the question queuing and screening process allows for participants' questions to be visible on a conference operator's web-based (HTML) visual dashboard. From there, participant questions can be filtered, upvoted, and positioned in a virtual queue by a 'drag and drop' UI (user interface). This enables participants to ask questions live, and then to be returned to a listen-only broadcast room in an efficient and user friendly manner regardless of from which platform the participant is connected and with minimum disruption to conference flow.

According to an exemplary embodiment of the invention there is disclosed a method of creating a virtual conference that combines online audio/video conferencing with telephony/teleconferencing where telephony participants are automatically connected to a web based audio/video conference. Beneficially, the method may leverage existing functionality of the telephone conference platform to connect the telephonic participants to the conference by calling out without required said participants to dial in.

According to an exemplary embodiment of the invention there is disclosed a question selection and screening method with a web-based dashboard for question screeners (operators) who can click an "available" button to cause the system to automatically select an unscreened participant and/or utilize a drag and drop UI to move participants around the dashboard and into private screening rooms and the main conference area of a virtual meeting.

According to an exemplary embodiment of the invention there is disclosed a single integrated question queue that allows meeting staff to screen questions from participants on multiple underlying conference platforms—for example, participants who have connected to the meeting via a telephonic conference platform and participants who have connected to the meeting via an online conference platform. In some embodiments, the meetings are secured through a magic link and verified phone participation so meeting staff can hold votes with confidence.

According to an exemplary embodiment of the invention, a controller of a virtual conferencing system commands an online conference platform to create an online main conference room associated with a meeting, and commands a telephonic conference platform to create a telephonic main conference room associated with the meeting. The controller further commands at least one of the online and telephonic conference platforms to join the online main conference room and the telephonic main conference room together so audio is passed therebetween to form an integrated main conference room. A similar process is used to create an integrated screener room. The controller stores a question queue identifying both online and telephonic attendees who have questions. Attendees who have an unscreened question are moved into either an online or telephonic part of the integrated screener room depending on the way the attendee joined the meeting. Moderators move both telephonic and online attendees with screened questions into the main conference room.

According to an exemplary embodiment of the invention there is disclosed a controller of a virtual conferencing system. The controller includes one or more storage devices storing therein a plurality of software instructions, one or more communications interfaces coupled to an online conference platform and a telephonic conference platform, and one or more processors coupled to the one or more storage devices and the one or more communications interfaces. By the one or more processors executing the software instructions loaded from the one or more storage devices, the one or more processors are configured to command the online conference platform to create an online main conference room associated with a meeting and command the telephonic conference platform to create a telephonic main conference room associated with the meeting. The one or more processors are further configured to command at least one of the online conference platform and the telephonic conference platform to join the online main conference room and the telephonic main conference room together such that audio in the online main conference room is passed to the telephonic main conference room and vice versa; wherein the online main conference room and the telephonic main conference room joined together form an integrated main conference room According to an exemplary embodiment of the invention there is disclosed a controller of a virtual conferencing system. The controller includes one or more storage devices storing therein a plurality of software instructions, one or more communications interfaces coupled to a first conference platform and a second conference platform, and one or more processors coupled to the one or more storage devices and the one or more communications interfaces. By the one or more processors executing the software instructions loaded from the one or more storage devices, the one or more processors are configured to command the first conference platform to create a first main conference room associated with a meeting and command the second conference platform to create a second main conference room associated with the meeting. The one or more processors are further configured to command at least one of the first conference platform and the second conference platform to join the first main conference room and the second main conference room together such that audio in the first main conference room is passed to the second main conference room and vice versa; wherein the first main conference room and the second main conference room joined together form an integrated main conference room.

According to an exemplary embodiment of the invention there is disclosed a method of controlling a virtual conferencing system. The method being performed by one or more processors of a controller for the virtual conferencing system. The method includes commanding an online conference platform to create an online main conference room associated with a meeting and commanding a telephonic conference platform to create a telephonic main conference room associated with the meeting. The method further includes commanding at least one of the online conference platform and the telephonic conference platform to join the online main conference room and the telephonic main conference room together such that audio in the online main conference room is passed to the telephonic main conference room and vice versa; wherein the online main conference room and the telephonic main conference room joined together form an integrated main conference room.

According to an exemplary embodiment of the invention there is disclosed a method of controlling a virtual conferencing system. The method is performed by one or more processors of a controller for the virtual conferencing system. The method includes commanding a first conference platform to create a first main conference room associated with a meeting and commanding a second conference platform to create a second main conference room associated with the meeting. The method further includes commanding at least one of the first conference platform and the second conference platform to join the first main conference room and the second main conference room together such that audio in the first main conference room is passed to the second main conference room and vice versa; wherein the first main conference room and the second main conference room joined together form an integrated main conference room.

According to an exemplary embodiment of the invention there is disclosed a non-transitory processor-readable medium comprising processor executable instructions that when executed by the one or more processors of a controller for a virtual conferencing system cause the one or more processors to perform one of the above methods.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
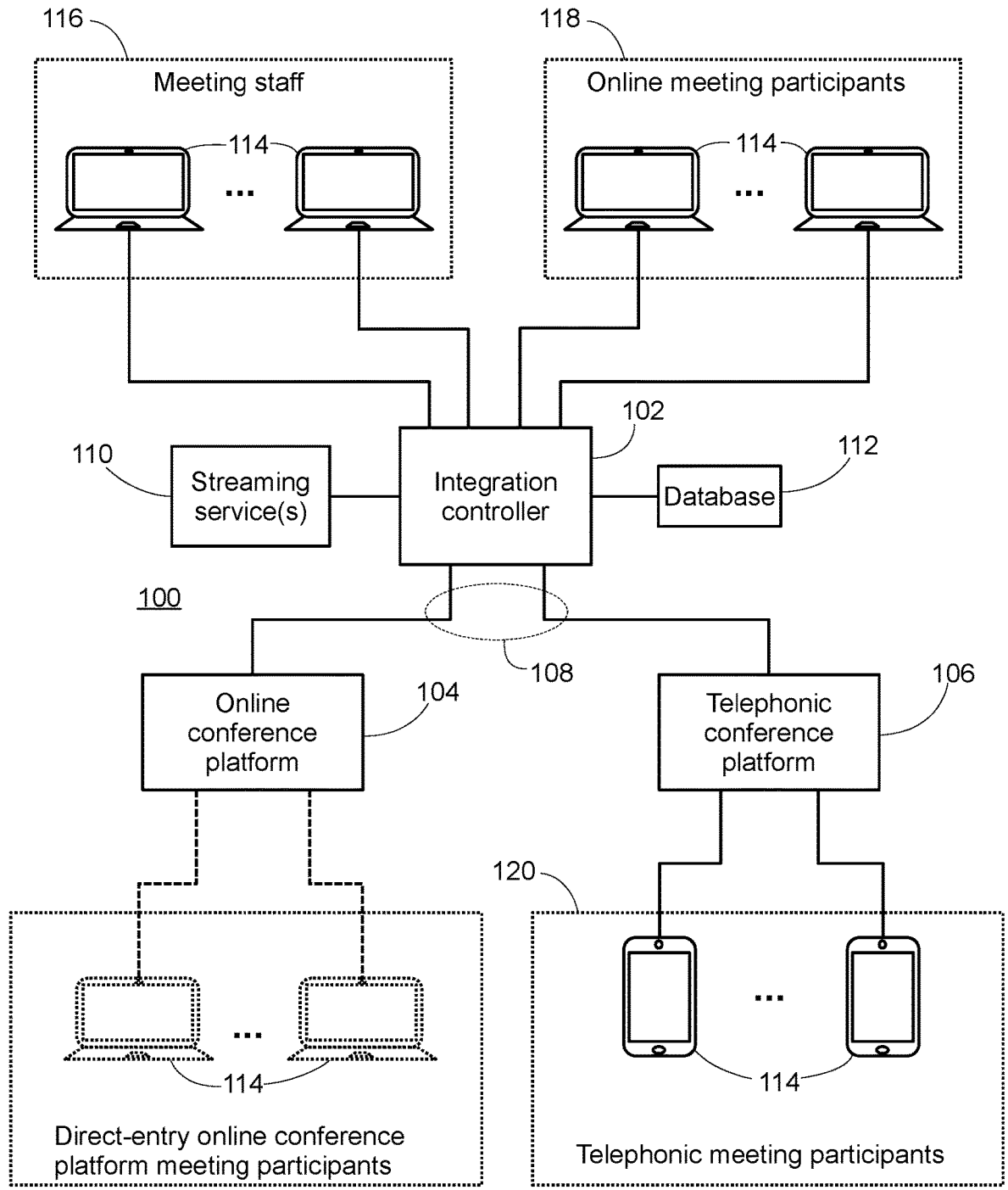
FIG. 1 illustrates a block diagram showing a system for integrating an online conference platform and a telephonic conference platform to thereby form an integrated conference platform according to an exemplary embodiment of the invention.

FIG. 1 illustrates a block diagram showing a system 100 for integrating an online conference platform 104 and a telephonic conference platform 106 to thereby form an integrated conference platform according to an exemplary embodiment of the invention.

The system 100 includes an integration controller 102 coupled to the online conference platform 104 and the telephonic conference platform 106, where platforms 104, 106 in one example may be the Jitsi™ online conference platform and the Telnyx™ telephonic conference platform, respectively. In many embodiments, the integration controller 102 is coupled via the Internet to these separate conference platforms 104, 106 and the integration controller 102 may access application programming interfaces (APIs) and/or user interfaces (UIs) provided by these platforms over the Internet. In other embodiments, the connections 108 between the integration controller 102 and the online and telephonic conference platforms 104, 106 may be via other communication links such as dedicated communication links separate from the Internet.

In addition to being coupled to external online and telephonic conference platforms 104, 106, the integration controller 102 in this embodiment is also coupled to one or more streaming services 110 and a database 112. In some embodiments, the streaming service 110 may be a cloud-based (i.e., Internet coupled) software-as-a-service (SaaS) provided by a cloud computing provider. Other types of streaming services 106 include video broadcasts such as Cable-Satellite Public Affairs Network (C-SPAN), Real-Time Messaging Protocol (RTMP) streams, radio stations, etc. In some embodiments, the integration controller 102 and the database 112 are implemented by a virtual computer server instance hosted on one or more servers provided by the same cloud computing provider.

Users of the system 100 utilize personal computing devices 114 such as computers, laptops, netbooks, mobile phones, tablets, etc. to connect with various ones of the integration controller 102, the online conference platform 104, and/or telephonic conference platform 106 to join and participate in meetings.

As utilized herein, the terms 'meeting' and 'conference' refer to the same thing, namely, an event where multiple people participate to discuss items of common interest. In this description, the event itself is referred to as a 'meeting', while the virtual rooms in which users may be virtually located during the meeting are referred to as 'conference rooms'. However, it is to be understood that this usage of the terms meeting and conference is stylistic in nature and the terms could be reversed or changed without otherwise altering the system structure and technical operations as described herein.

As shown in FIG. 1, meeting staff 116 such as administrators, screeners, and moderators, utilize computing devices 114 to configure, manage and join a meeting by accessing the integration controller 102. This may involve the meeting staff 116 computing devices 114 accessing a uniform resource locator (URL) or other network address of the integration controller 102 via the Internet. Likewise, online meeting participants 118 such as online speakers/presenters and online attendees join the meeting by utilizing their computing devices 114 to access the integration controller 102 via the Internet. In some embodiments, meeting staff 116 and online meeting participants 118 may access different network addresses of the integration controller 102 depending on their user type; in other embodiments, the meeting staff 116 and online meeting participants 118 access the same network address of the integration controller 102 and are simply given different functionality by the integration controller 102 according to their user type after being authenticated during a login process conducted by the integration controller 102.

Rather than accessing the integration controller 102 via the Internet, telephonic meeting participants 120 join the meeting by accessing the telephonic conference platform 106. Generally speaking, this may done by either the telephonic meeting participants 120 dialing a phone number of the telephonic conference platform 106 or by the telephonic conference platform 106 dialing a phone number of a telephonic meeting participant 120.

Lastly, although not utilized in this particular embodiment, it is also possible and therefore illustrated in FIG. 1 that some online participants may join the meeting by directly accessing a URL or other network address of the online conference platform 104. These user devices 114 are labeled in FIG. 1 as direct-entry online conference platform 104 meeting participants 122; however, as this direct-entry connection is not utilized in this embodiment, these direct-entry online participants 122 are shown in dashed lines. Further description of other embodiments where online meeting attendees may join a meeting by directly accessing the online conference platform 104 are described later.

Figure 2:
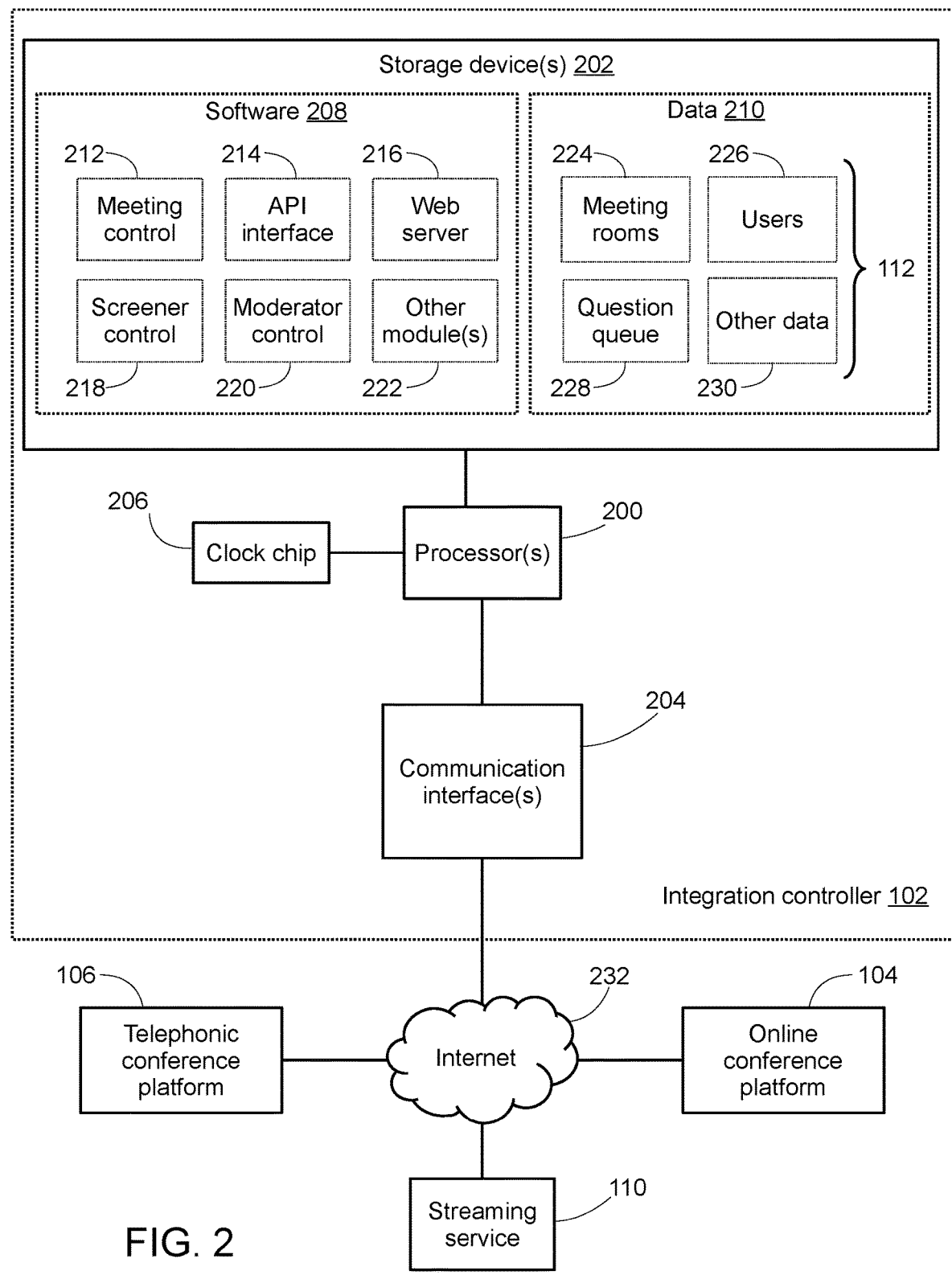
FIG. 2 illustrates a block diagram of the integration controller of FIG. 1 being a computer server according to an exemplary embodiment.

FIG. 2 illustrates a block diagram of the integration controller 102 being a computer server according to an exemplary embodiment. The integration controller 102 includes one or more processors 200 coupled to one or more storage devices 202 and one or more communication interfaces 204. A clock chip 206 such as a real time clock (RTC) is also coupled to the one or more processors 200 to allow scheduling of events based on time of day and elapsed time duration.

The one or more storage devices 202 may include random access memory (RAM), magnetic and FLASH based hard drives, and other storage types to store both software 208 and data 210. In this embodiment, the software 208 includes a plurality of modules including, for example, a meeting control module 212, an API interface module 214, a web-server module 216, a screener control module 218, and a moderator control module 220. Other software modules 222 may be included as needed. The data 210 utilized by the integration controller 102 is organized in this embodiment as a database 112 having a number of tables. Examples of database 112 tables storing different types of information include a meeting rooms table 224, a users table 228 and a question queue table 228. Other database tables 230 may also be stored in the database 112 as needed. In this embodiment, a relational database 112 is utilized to implement the database 112; however, the term "database" as utilized in this description is meant to refer to any stored collection of organized data 210.

The communication interface(s) 204 may include one or more Ethernet transceivers for coupling the integration controller 102 to the Internet 232. As illustrated, the communication interfaces 204 enable the one or more processors 200, executing the API interface module 216, to access APIs and user interfaces of the online conference platform 104, the telephonic conference platform 106, and the streaming service 110 via the Internet 232. Other types of communication interfaces 204 may also be included as needed.

The one or more processors 200 may be included in a central processor unit (CPU) of a computer server acting as the integration controller 102. In the following description the plural form of the word "processors" will be utilized as it is common for a CPU of a computer server to have multiple processors 200 (sometimes also referred to as cores); however, it is to be understood that a single processor 200 may also be configured to perform the described functionality in other implementations.

Figure 3:
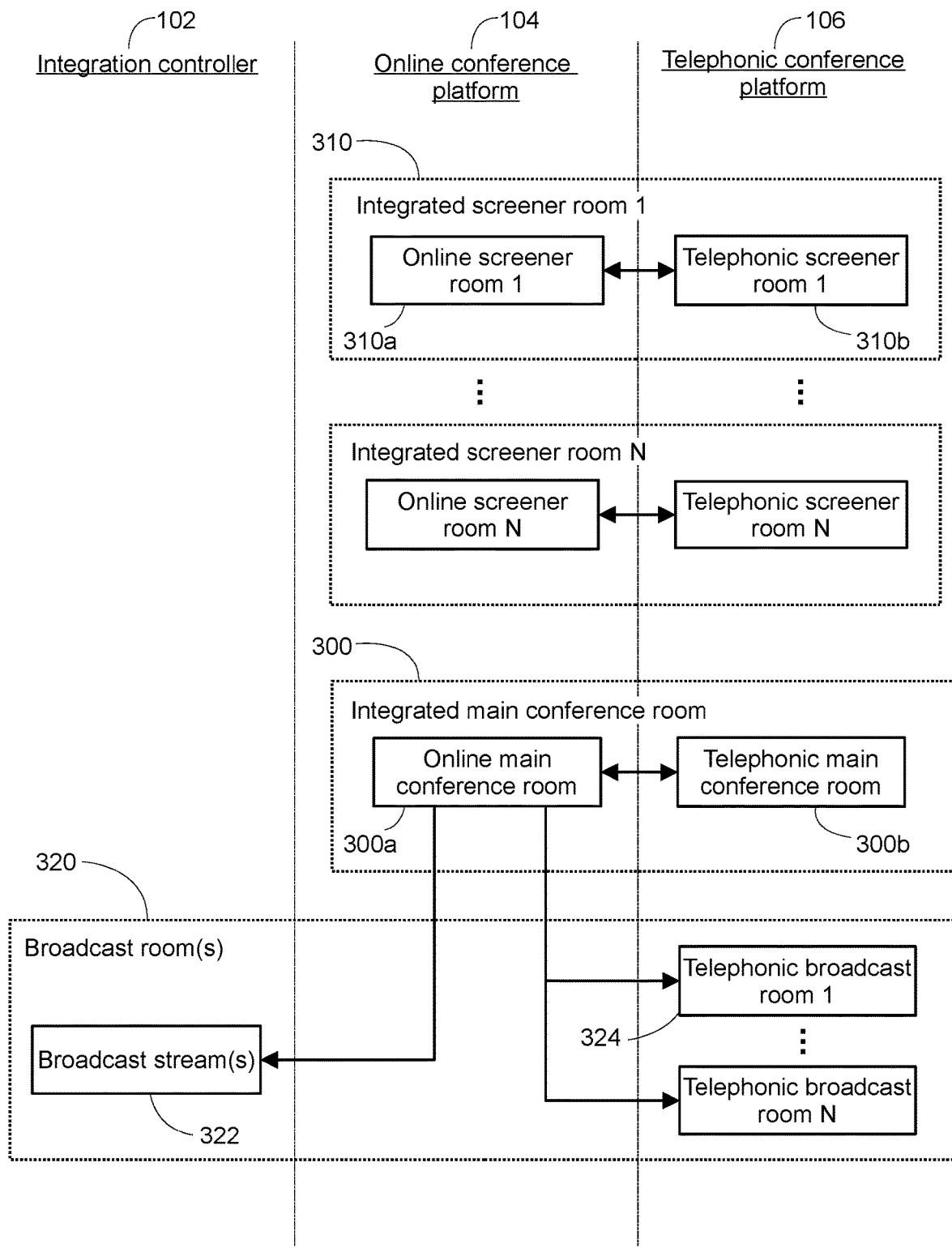
FIG. 3 illustrates a room correspondence diagram showing how a plurality of different integrated virtual conference rooms for conducting a meeting are formed by joining corresponding conference rooms created on the online conference platform and the telephonic conference platform according to an exemplary embodiment.

FIG. 3 illustrates a room correspondence diagram showing how a plurality of different integrated virtual conference rooms for conducting a meeting are formed by joining corresponding conference rooms created on the online conference platform 104 and the telephonic conference platform 106 according to an exemplary embodiment.

In this embodiment, a single meeting includes a plurality of integrated conference rooms including a main conference room 300, one or more screener rooms 310, and one or more broadcast rooms 304.

The integrated main conference room 300 is formed by an online main conference room 300a hosted on the online conference platform 104 and a corresponding telephonic main conference room 300b hosted on the telephonic conference platform 106. These two main conference rooms 300a,b on the different platforms 104, 106 are joined together by passing audio therebetween such that audio in the online main conference room 300a is passed to the telephonic main conference room 300b and vice versa. The purpose of the integrated main conference room 300 is to host the speakers and presenters of the meeting. For example, during a virtual town hall meeting, a politician speaker and one or more moderator may be discussing various topics with each other in the main conference room 300. In another example, during an annual general meeting (AGM), executives and board members of a company may report and discuss various corporate business matters in the main conference room 300. Because the integrated main conference room 300 has audio from both the online and telephonic main conference rooms 300a,b, participants can join either via an online connection or via a telephonic connection at their preference.

The integrated broadcast room 320 is formed in this embodiment by one-way audio transmission from the main conference room 300 to both an online broadcast stream 322 and one or more telephonic broadcast rooms 324. Regarding the telephonic broadcast rooms 324, all audio from the integrated main conference room 300, which includes audio that originates in both of the online main conference room 300a and the telephonic main conference room 300b, is forwarded to each of the telephonic broadcast rooms 324. The integration controller 102 configures the various telephonic broadcast rooms 324 to be listen-only rooms such that attendees in these rooms 324 cannot speak to each other. In this way, a plurality of meeting attendees may call in to the telephonic conference platform 106 to join one of the telephonic broadcast rooms 324 and thereby hear the audio from the meeting (i.e., from the integrated main conference room 300) but not speak in the meeting as long as they remain in the telephonic broadcast room 324.

The broadcast stream 322 is formed by an audiovisual stream from the integrated screener room 300 directed to the streamer service 110 by the integration controller 102. In some embodiments, the integration controller 102 forwards the video and audio from the online main conference room 300a to the streamer service 110 because the online main conference room 300a also includes the audio from the telephonic main conference room 300b as a result of the online and telephonic rooms 300a,b being joined. The streamer service 110 encodes this audiovisual input and streams one or more resulting livestreams 322 as either multicast and/or unicast out to various meeting attendees via the Internet 232.

Beneficially, the meeting attendees that join the meeting in the broadcast room 320 are not able to interrupt the meeting because audio from attendees in the telephonic broadcast room(s) 324 is not passed to the main conference room 300 and the broadcast stream 322 by its nature is a one-way communication. In this way, attendees in the broadcast room 320, regardless of the underlying platform (either online or telephonic) from which they have joined the meeting, can either watch and listen to the broadcast stream 322 via their computer over the Internet 232 or just listen to the audio-only portion by calling a telephonic broadcast room 324 using their phone.

In this embodiment, one or more integrated screener rooms 310 are also created by the integration controller 102 to support the meeting. Each integrated screener room 310 includes both an online screener room 310a created on the online conference platform 104 and a corresponding telephonic screener room 310b created on the telephonic platform 106, and these two screener rooms 310a,b are joined together by the integration controller 102 such that audio in the online screener room 310a is passed to the telephonic screener room 310b and vice versa. As will be described further in the following, each integrated screener room 310 is used by a screener user as a breakout room to privately screen meeting participants who may wish to ask a question regardless of the underlying conference platform (either telephonic 106 or online 104) from which the meeting participants are connected. Each particular screener room 310 allows the meeting attendee(s) and screener user within that particular screener room 310 to hear each other (and see each other if both are connecting via the online screener room 310a). However, audio from each of the integrated screener rooms 310 is not forwarded back to the main conference room 300 and therefore does not interrupt the main conference part of the meeting.

Figure 4:
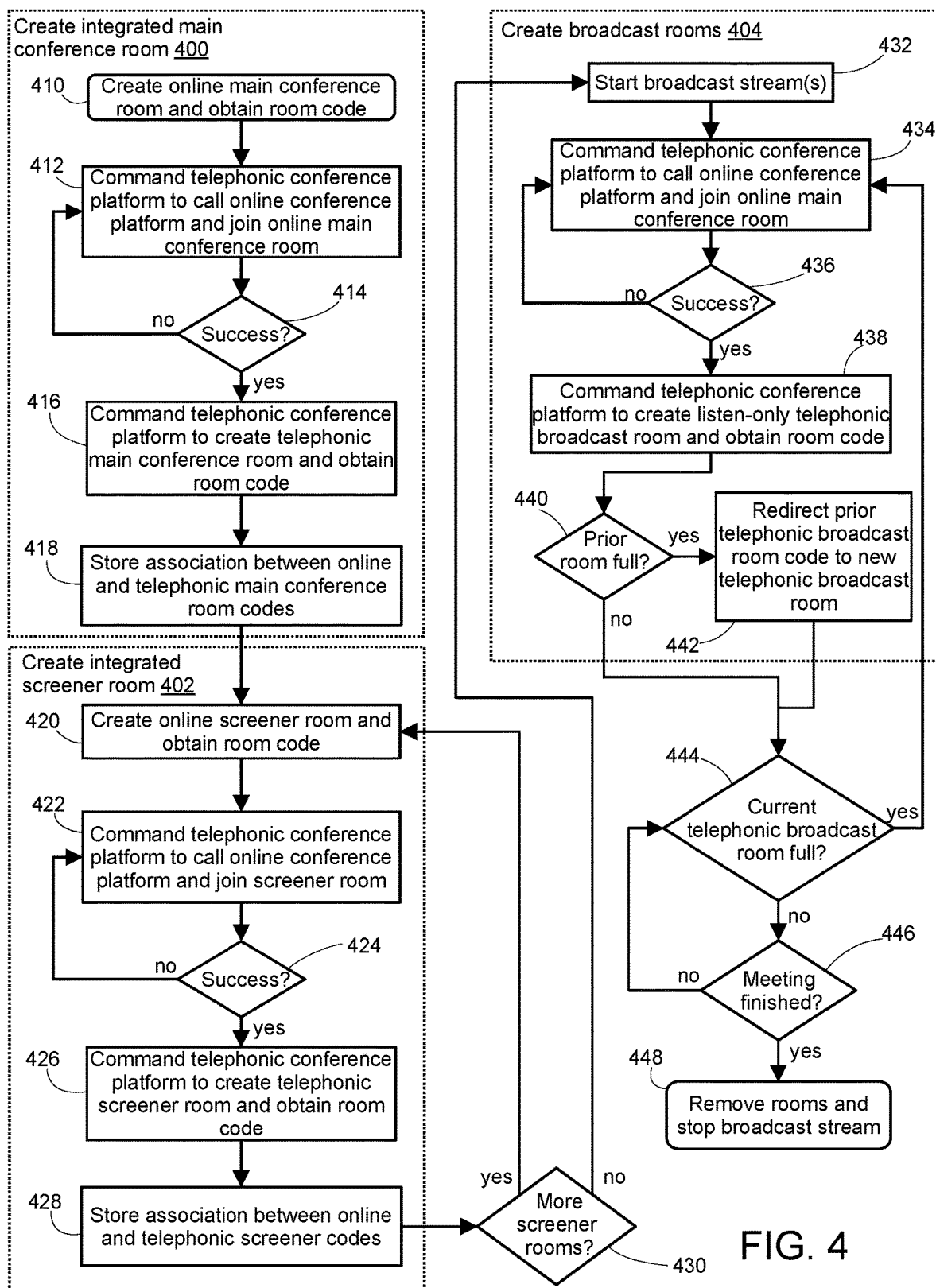
FIG. 4 illustrates a flowchart of a method of initialization of a new meeting by the integrated controller of FIG. 1 according to an exemplary embodiment.

FIG. 4 illustrates a flowchart of a method of initialization of a new meeting by the integrated controller 102 according to an exemplary embodiment. The steps of FIG. 4 may be performed by the processors 200 of the integration controller 102 executing the meeting control software module 212 loaded from the storage device 202, for example. The steps of the flowchart are not restricted to the exact order shown, and, in other configurations, shown steps may be omitted or other intermediate steps added.

At a high-level, the meeting initialization process in this embodiment involves creating an integrated main conference room 300 at step 400, creating one or more integrated screener rooms 310 at step 402, and creating a plurality of broadcast rooms 322, 324 at step 404.

At a lower-level, the creation of the main conference room 300 begins in this embodiment at step 410 by the processors 200 of the integration controller 102 accessing the online conference platform 104 (e.g., via an API or online UI) in order to command the online conference platform 104 to create an online main conference room 300a. As a part of the creation process, the processors 200 receive a room code being an identifier for identifying the online main conference room 300a from other rooms that are present on the online conference platform 104.

At step 412, the processors 200 access the telephonic conference platform 106 and command the telephonic conference platform 106 to call a phone number of the online conference platform 104 and join the online main conference room 300a. In this embodiment, the online conference platform 104 includes some limited support for telephonic users such as to call in to a meeting and enter a room code in order to telephonically join a conference room identified by the room code. The integration controller 102 takes advantage of this capability to send one or more commands to the telephonic conference platform 106 to cause the telephonic conference platform 106 to initiate a call leg that calls the online platform 104 and supplies the room code to enter the online main conference room 300a.

In some embodiments, step 412 is performed by an outgoing call leg from the telephonic conference platform 106 being a session initiation protocol (SIP) connection or other voice over Internet Protocol (VoIP) connection supported by both the online conference platform 104 and the telephonic conference platform 106. The room code may be passed via this SIP connection as either parameters or dual tone multi frequency (DTMF) touch tones. Alternatively, in other embodiments, the integration controller 102 commands the telephonic conference platform 106 to initial a call leg being normal phone call by actually calling the phone number of online conference platform 104 like a regular user would and then entering the room code via DTMF touch tones.

At step 414, the processors 200 determine whether the telephonic conference platform 106 has successfully called and entered the online main conference room 300a. This may be done by checking result codes or webhooks received via the API of the telephonic and/or online conference platforms 104, 106. When successful (i.e., the telephonic conference platform 106 has successfully called and entered the online main conference room), control proceeds to step 414. Otherwise, if there was a problem or failure of some kind, control returns to step 412 to try again.

At step 416, the processors 200 command the telephonic conference platform 106 to create a telephonic main conference room 300b based on the call leg initiated in step 412 that is now joined to the online main conference room 300a. In this way, the online main conference room 300a and the telephonic main conference room 300b are joined together to form the integrated main conference room 300 such that participant audio in the online main conference room 300a is passed to the telephonic main conference room 300b and vice versa via the call leg. As a part of the creation process, the processors 200 also receive a room code from the telephonic conference platform 106 being an identifier for identifying the telephonic main conference room 300b from other rooms that are present on the telephonic conference platform 106.

At step 418, the processors 200 save in the meeting rooms table 224 of the database 112 (i.e., stored in the one or more storage devices 202), an association between the online and telephonic main conference room 300a,b room codes. These two room codes, one for the online main conference room 300a and one for the telephonic main conference room 300b, together identify the two underlying rooms 300a,b forming the integrated main conference room 300.

The creation of each of the screener conference rooms 310 begins at step 420 by the processors 200 of the integration controller 102 creating an online screener room 310a on the online conference platform 104 and obtaining the associated room code. This step is somewhat similar to step 410 described-above, except it creates an online screener room 310a instead of the online main conference room 300a. Also similar to as described above, at step 422, the processors 200 command the telephonic conference platform 106 to call the online conference platform 104 and join the newly created screener room 310a. At step 424, the processors 200 ensure success of step 422 and, at step 426, the processors 200 command the telephonic conference platform 106 to create a telephonic screener room 310b based on the call leg utilized at step 422. At step 428 the processors 200 store in the meeting rooms table 224 of the database 112 an association between the online and telephonic screener room codes 310a,b obtained at steps 420 and 428, respectively. These steps are similar to the corresponding steps 412-418 described above except being for a screener room 310 instead of the main conference room 300.

At step 430, the processors 200 determine whether there are still more integrated screener rooms 310 to create. In this embodiment, the number of screening rooms 310 to create depends on how many screener users will be present during the meeting. Each human screener user may get their own respective screener room 310. Large meetings with many participants who may ask question may require a larger number of screeners than a small meeting with only a few participants who may need their questions to be screened. If there are more screener rooms 310 to create, the process returns to step 420 to create a next integrated screener room 310. Alternatively, if all screener rooms 310 have been successfully created, control proceeds to step 432.

The creation of the broadcast rooms 320 begins at step 432 by the processors 200 firstly initiating a livestream 322 of the online main conference room 300a. The livestream 322 is made available at a particular network address such as being sent to various attendee computing devices 114 from the network address of the streamer service 110. The livestream 322 includes audio and video of the online main conference room 300a, which is joined with the telephonic main conference room 300b to form the integrated main conference room 300 and therefore also includes the audio of the telephonic participants 120 in the telephonic main conference room 300b.

Beneficially, in this embodiment, there are no user limits to the number of online attendees 118 or per-user fees charged by the online conferencing platform 104 for the various online attendees 118 that receive the broadcast livestream 322 like there would be if the online attendees 118 users were all actually joining the online main conference room 300a as users on the online conference platform 104. Instead, each user viewing/listening to the livestream 322 merely results in streaming costs from the streaming service 110, which are typically much lower than the per-user conference attendee costs on the online conference platform 104.

At steps 434 to 438, the processors 200 create a telephonic broadcast room 324. The general flow for each telephonic broadcast room 324 in this embodiment involves the processors 200 of the integration controller 102 at step 434 commanding the telephonic conference platform 106 to call the online conference room 300a and join the online main conference room 300a. The room code for the online main conference room 300a is already known to the processors 200 as it was stored within the meeting rooms table 224 of the database 112 at step 418. Step 434 is similar to step 412 previously described. The processors 200 then determine whether the online main conference room 300a was successfully joined (step 436) and, assuming yes, to command the telephonic conference platform 106 to create a listen-only telephonic broadcast room 324 based on the current call leg utilized in step 434 to join the online conference room 300a.

To avoid callers in the telephonic broadcast room from interrupting the main conference room, the processors 200 command the telephonic conference platform 106 at step 438 to configure the telephonic broadcast room to be a listen-only room such that new attendees can only listen (receive audio) and cannot speak (send audio) in the telephonic broadcast room 324.

Some telephonic conferencing platforms 106 have hard limits on the number of attendees that may join a meeting room. For instance, there may be a hard limit of 800 attendees per room. For large town hall or AGM meetings, the number of listen-only users may greatly exceed these limits, thus the integration controller 102 in this embodiment dynamically creates additional telephonic broadcast rooms 324 as needed. Once a prior-created telephonic broadcast room 324 reaches a threshold number of users, the integration controller 102 will automatically create a new telephonic broadcast room 324 utilizing the above steps 434-438 and thereafter reconfigure the telephonic conferencing platform 106 to redirect the room code for the prior created telephonic broadcast room 324 to the newly created telephonic conference room 324.

This process of dynamically creating additional telephonic broadcast rooms 324 as needed is illustrated in FIG. 4 at step 440 where the processors 200 determine whether the telephonic broadcast room 324 newly created at steps 434 to 438 was created as a result of a prior telephonic broadcast room 324 becoming full (i.e., reaching a predetermined number of users such as 750 users in the case the maximum number of room users supported by the underlying platform 106 is 800 users per room). When yes, control proceeds to step 442 where the processors 200 sends one or more commands to the telephonic conference platform 106 to redirect the old telephonic broadcast room code 324 to the newly created telephonic broadcast room 324. In this way, the same room code can still be used by attendees to join each subsequently created telephonic broadcast room 324, i.e., to join the meeting, and this same code will cause attendees to be placed into the most recently created telephonic broadcast room 324.

At step 444, the processors 200 monitor the number of users of the most recently created telephonic broadcast room 324 to determine when the room 324 is full. For instance, if the hard limit on number of users per room as supported by the telephonic conference platform 106 is 800, the threshold utilized by the integration controller 102 may be 750 users. Once the telephonic broadcast room 324 has more than 750 users, the room will be deemed to be "full" at step 444 and control will return back to step 434 for the integration controller 102 to create a new telephonic broadcast room 324 and then configure the telephonic platform 106 to redirect the old broadcast room code to the newly created room 324.

At step 446, the processors 200 determine whether the meeting has finished. This may be performed in a number of ways such as, for example, receiving a meeting finished message from a moderator or administrator, when the current time as measured by the clock chip 206 reaches a predetermined meeting end time, or when no underlying rooms 300a, 300b, 310a, 310b, 324 associated with the meeting have any participants for a predetermined threshold time duration as measured by the clock chip 206. Any other desired meeting finished conditions may be utilized in other embodiments as desired.

After the meeting is finished, at step 448, the processors 200 send a plurality of commands to the streaming service 110, online conference platform 104 and telephonic conference platform 106 to remove the various underlying rooms 300a, 300b, 310a, 310b, 324 created for the meeting and to stop the broadcast stream 322.

Figure 5:
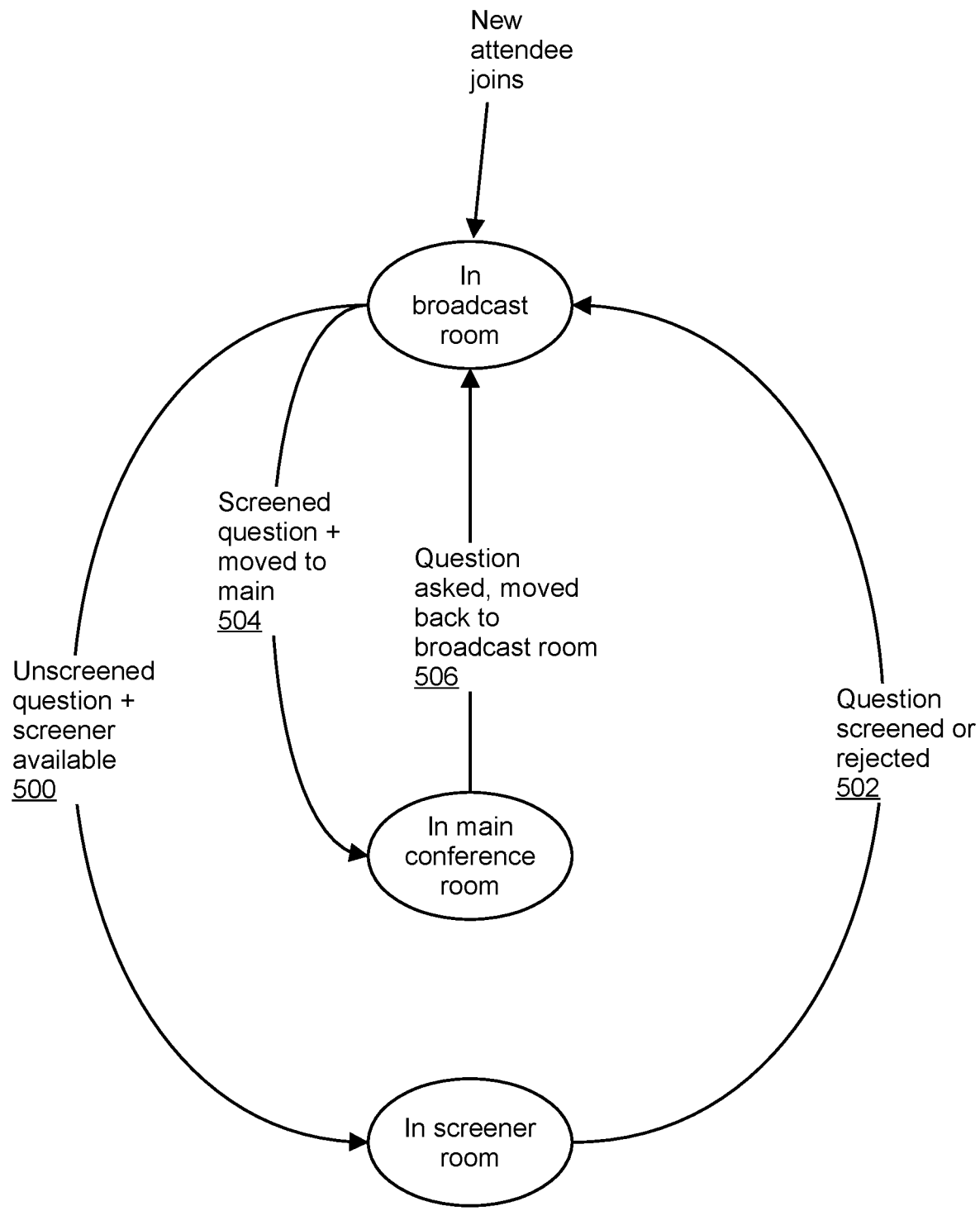
FIG. 5 illustrates a state diagram showing how an attendee can change between different integrated rooms of a meeting according to an exemplary embodiment.

FIG. 5 illustrates a state diagram showing how an attendee can change between different integrated rooms 300, 310, 320 of a meeting according to an exemplary embodiment. Meeting attendees in this embodiment are always deemed to be in one of the following states: in a broadcast room 320, in the main conference room 300, or in one of the screener rooms 310.

The default room for a new attendee joining the meeting would be to entered into a broadcast room 320. The specific underlying broadcast room 320 will depend upon the way the user joins the meeting—if they join by phone, they will be placed into a telephonic broadcast room 324 and if they join online they will be receiving the broadcast livestream 322.

At some point during the meeting, the attendee may have a question and may indicate using a user interface available to the user depending on how they joined the meeting. Telephonic attendees 120 may press a particular touch tone key to indicate they have a question while online attendees 118 may type in their question and click a button utilizing a user interface (UI) provided on a webpage on which the livestream 322 is playing in a web browser or other application running on the attendee's computing device 114.

Upon an attendee initially indicating they have a question, the question will be deemed by the integration controller 102 to be an unscreened question. The integration controller 102 will monitor for the availability of a screener and then, when a screener is available, will move the user from the broadcast room 300 to a particular screen room 310 associated with the available screener. This room move is indicated as state transition 500 in FIG. 5.

The screener then discusses the question with the attendee in the screener room 310 and optionally marks the question as being screened or deleted depending on the opinion of the screener about the suitability of the question and/or the attendee asking the question. The attendee is then moved back into the broadcast room 320, which is indicated as state transition 502.

When an attendee with a screened question is selected by a moderator to actually join the main conference room 300, the attendee will be moved from the broadcast room 320 to the main conference room 300. This room move is indicated as state transition 504.

Lastly, after asking their question and optionally discussing the answer with the presenters in the main conference room 300, the attendee will be moved back to the broadcast room 320 and the question will be marked as having been asked—state transition 506. At this point, the attendee may ask another question (above-described process and state changes repeat).

Figure 6:
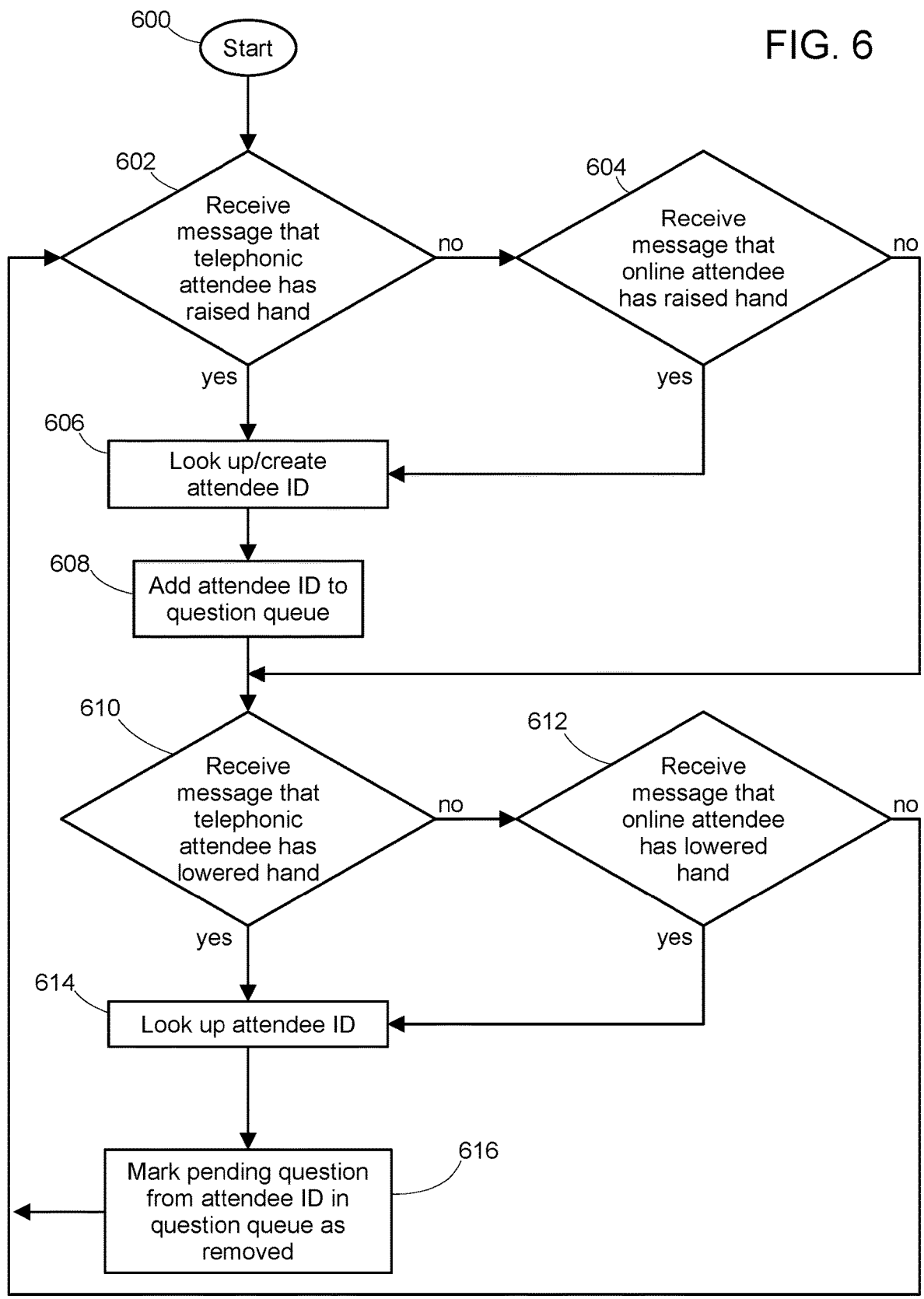
FIG. 6 illustrates a flowchart of a method of processing an attendee virtually raising their hand to get on the question queue according to an exemplary embodiment.

FIG. 6 illustrates a flowchart of a method of processing an attendee virtually raising their hand to get on the question queue 228 according to an exemplary embodiment. The steps of FIG. 6 may be performed by processors 200 of the integration controller 102 executing the meeting control software module 212 loaded from the storage device 202, for example. The steps of the flowchart are not restricted to the exact order shown, and, in other configurations, shown steps may be omitted or other intermediate steps added.

The process starts at step 600 and continues to loop until the meeting ends. In some embodiments, the start condition may correspond to when the first attendee joins a new meeting.

At step 602, the processors 200 determine whether they have received a message that a telephonic attendee 120 has raised their hand. In some embodiments, when a telephonic attendee 120 joins a meeting they hear an announcement just prior to joining the telephonic broadcast room 324 that informs them what touch tone key they may press in order to virtually "raise their hand" in order to ask a question. Thereafter, the telephonic conference platform 106 monitors for this tone and, when detecting an attendee as pressed the tone, sends a hand-raised message to the integration controller 102. The integration controller 102 may also poll the telephonic conference platform 106 to check whether any particular users have pressed the touch tone to raise their hands. As such, the message referred to at step 602 may be received via a push message or pull message from the telephonic conference platform 106. The message includes a telephonic user identifier identifying the particular user who has now raised their hand (i.e., pressed the predetermined touch tone key to indicate they have a question). When there is a message that a telephonic attendee has raised their hand, control proceeds to step 606; otherwise, control proceeds to step 604.

At step 604, the processors 200 determine whether they have received a message that an online meeting attendee 118 has raised their hand. In some embodiments, online attendees 118 who are in the broadcast room 320 watching the broadcast livestream 322 are provided a user interface including a chat box to type a question and a button to click to raise their hand and submit their question for screening to the integration controller 102. In response to receiving such a message indicating that a particular online attendee 118 has raised their hand with a question, control proceeds to step 606; otherwise, control proceeds to step 610 to check if an attendee's virtual hand has been lowered.

For both steps 602 and 604, the messages received may also be other types of messages and from other sources. For instance, in some embodiments, the audio captured from a participants microphone is fed to an artificial intelligence (AI) or other speech recognition system to analyze what people say when their mic is not live to the conference such as while in the broadcast room. The AI may then determine from the user's speech whether the user has a question or comment. Likewise, a similar process may be performed by feeding participant video from webcam into an AI or other video processing algorithm to detect gestures such as a participant physically raising their hand in order to indicate they have a question. In some embodiments, an AI or other system detects gestures and/or speech from a participant and passes a message to the integration controller 102 indicating whether a participant, either online or telephonic, has a question and is therefore deemed to have 'raised their hand' at steps 602, 604. Combinations of different methods of detecting participants raising their hands (e.g., touch tones, website buttons, gestures, voice commands, audio signals, etc.) can be used simultaneously in a single embodiment to create messages from different sources at steps 602, 604.

At step 606, the processors 200 look up or create an attendee identifier (ID) corresponding to the attendee determined to have raised their hand at step 602 or 604. Because there are two independent underlying conference platforms, i.e., online conference platform 104 and telephonic conference platform 106, each may have different user identifier formats and numbering systems. As online attendees log in and join the meeting, the integration controller 102 may create or lookup a central user identifier for each separate user and store said identifiers and login records in the users table 226. Thereafter, when a particular online attendee 118 clicks a button on the webpage UI while in the broadcast room 320, the integration controller 102 may correlate a session ID of the webpage or other cookie value from which the message is received with the user identifier of that online user as stored in the users table 226 at step 606. Alternatively, when a telephonic attendee 120 presses a touch tone to indicate they have raised their hand, the integration controller 102 may lookup a telephonic attendee ID received from the telephonic conference platform 106 in the message at step 602 in the users table 226 to determine a central user identifier. If there is no central user identifier, one can be created at this step and the association of a user identifier received in the message at step 602 or 604 with the newly created central user ID may be stored in the users table 226 for future reference.

Table 1 shows an example of data columns that are stored in the users table 226 according to an exemplary embodiment. Other or different data columns may be stored in other embodiments.

TABLE 1

Example of users table

| Attendee ID | User Type | Name | Underlying conference platform | Conference platform user identifier |
|---|---|---|---|---|
| 1 | Attendee | Carl Mavromichalis | Online conference platform | A45-342-422 |
| 2 | Attendee | Konstantinos (Tino) Mavromichalis | Telephonic conference platform | 443 |

At step 608, the processors 200 add the attendee ID looked up or created at step 606 identifying the user who asked the question to the question queue table 228. For instance, Table 2 shows an example of data columns stored in the question queue table 228 according to an exemplary embodiment. Other or different data columns may be stored in other embodiments.

TABLE 2

Example of question queue table 228

| Attendee ID | Question | Question status | Rank | Screener comment |
|---|---|---|---|---|
| 1 | What is the projected project cost? | Deleted | — | Duplicate |
| 2 | Have you considered aborting the project? | Screened | 4/5 | Good but a bit aggressive. |
| 2 | How may new people will be engaged for the project? | Unscreened | — | — |
| 1 | How will this decision affect share price? | Screened | 4/5 | Good question. |

At steps 610 and 612, the processors 200 determine whether a message has been received indicating that a particular attendee as lowered their hand. For example, a part of the announcement played to telephonic attendees 120 just prior to joining the telephonic broadcast room 324 may include instructions of which touch tone key to press in order to lower their hand. Alternatively, for online users 118, after clicking a button to raise their hand with a submitted question, the UI may be updated by the integration controller 102 provide the online user 118 the ability to a click a "lower hand" or (cancel question) button. Similar to as described above for steps 602 and 604, the messages received at steps 610, 612 may be received by the integration controller 102 from either the telephonic conference platform 106 (at step 610) that a particular telephonic attendee 120 has lowered their hand, or from the computing device 114 of an online attendee 118 after the user has clicked a cancel question or other hand-lower UI control element on the webpage displayed to the user while they are in the broadcast room 320 watching the broadcast livestream 322.

At step 614, the processors 200 determine the attendee ID associated with the particular user to which the message step 610 or 612 corresponds, and at step 616 the processors 200 mark the pending question from this attendee ID in the question queue 228 with an updated status of "deleted".

Figure 7:
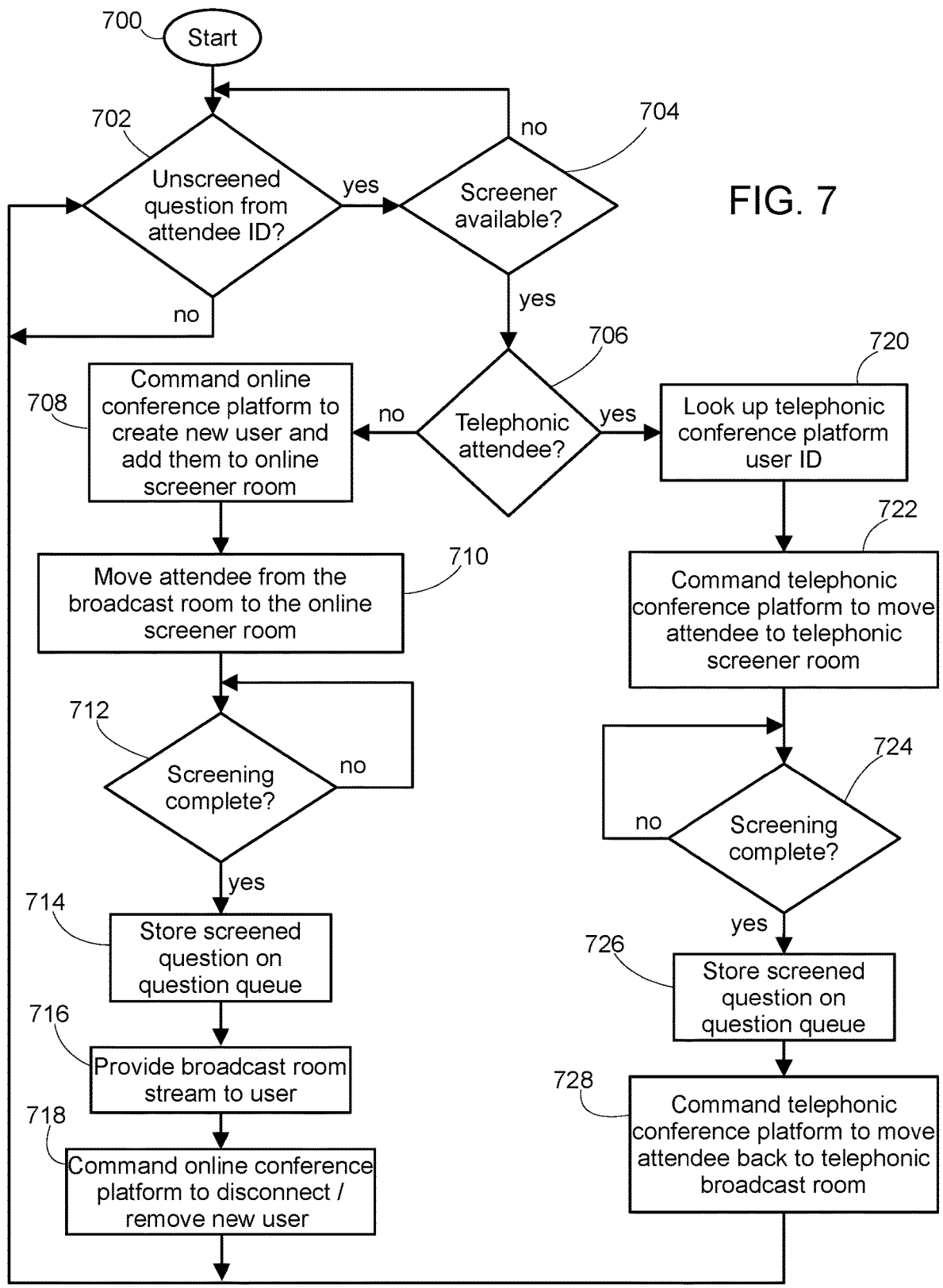
FIG. 7 illustrates a flowchart of a method of screening meeting attendees with unscreened questions on the question queue according to an exemplary embodiment.

FIG. 7 illustrates a flowchart of a method of screening meeting attendees with unscreened questions on the question queue 228 according to an exemplary embodiment. The steps of FIG. 7 may be performed by processors 200 of the integration controller 102 executing the screener control software module 218 loaded from the storage device 202, for example. The steps of the flowchart are not restricted to the exact order shown, and, in other configurations, shown steps may be omitted or other intermediate steps added.

The process starts at step 600 and continues to loop until the meeting ends. In some embodiments, the start condition may correspond to when the first attendee joins a new meeting.

At step 702, the processors 200 determine whether there is an unscreened question on the question queue 228. When yes, the processors 200 determine the attendee ID from which the unscreened question was asked and proceed to step 704; alternatively, when there are no unscreened questions on the question queue 228, control returns to step 702.

At step 704, the processors 200 determine whether there is an available screener. In this embodiment, each screener screens one question at a time by inviting the meeting attendee who asked the question to join the screener in a screener conference room 310. As described in more detail with reference to FIG. 10, the screener may indicate they are available by clicking a button on a screener UI webpage that says "Ready for next unscreened question". Alternatively, the screener may indicate their availability for a particular question/attendee by dragging dropping the particular question/attendee from a list of unscreened questions to a currently screening area the screener UI webpage. Either of these actions result in one or more messages being sent back from the screener's computing device 114 to the integration controller 102 indicating the availability of that screener. When there is a screener available at step 704, control proceeds to step 706; alternatively, if no screener is available, control returns to step 702 to try again a bit later on the next time around the loop.

At step 706, the processors 200 determine the whether the attendee ID who asked the unscreened question selected at step 702 is a telephonic attendee 120 or an online attendee 118. This is done in some embodiments by the processors 200 looking up the attendee ID in the users table 226 to determine the value in the 'underlying conference platform' column. If the attendee who asked the question is a telephonic attendee 120, control proceeds to step 720; otherwise, if the attendee who asked the question is an online attendee 118, control proceeds to step 708.

At step 708, the processors 200 command the online conference platform 104 to create a new user and add the new user to the online screener room 310a associated with available screener selected at step 704. As previously mentioned, in this embodiment, online attendees 118 who are in the broadcast room 320 are simply receiving a broadcast livestream 322 and are not actually real users taking up space in any conference room hosted by the online conferencing platform 104. Thus, in order to move the online attendee 118 who asked the question to the desired online screener room 310a, the integration controller 102 accesses the online conference platform 104 to create a temporary user account and further sends one or more commands via the API or user interface of the online conferencing platform 104 to cause the temporary user account to join the desired online screener room 310a. Alternatively, in other embodiments, this step may also be changed to first look up the online conference platform 104 user ID of the user to see if they already have an account on the online conference platform 104—this can be done by the processors 200 querying the users table 226 based on the attendee ID to check the "conference platform user identifier" column. If the user already has an account, the processors 200 command the online conference platform 104 to move the attendee's existing user account to the desired online screener room 310*a*.

At step 710, the processors 200 move the attendee from the broadcast room to the online screener room. In some embodiments, this is done by passing to the attendee's computing device a webpage including a page element being an iframe having a source address of the new user in the desired online screener room from the online conference platform 104. As will be described further with reference to FIG. 9, the iframe may be included in a webpage that further includes various UI controls for the attendee around a perimeter of the iframe or adjacent to the iframe. When in the broadcast room 320, the source of the iframe is set by the integration controller 102 to be the network address of the broadcast livestream 322 so the attendee can see and hear the meeting in progress—i.e., the livestream 322 renders within the iframe. When moved to a screener room 310, the source address of the iframe is changed by the integration controller 102 to be the new user in the desired online screener room 310*a*. The iframe source thereby points to the online conference platform 104 and causes the attendee's web browser to render within the iframe the audiovisual content similar to if a user was joining the online screener room directly on the online conference platform 104. In some embodiments, the iframe causes an online screener room user interface (UI) for the new user to execute within the iframe when the webpage is rendered by the browser application running on the computing device 114 of the online meeting participant 118. The content of the iframe allows the attendee's webcam and microphone to be accessed and the attendee 118 can thereafter conduct a mini-meeting with the screener inside the online screener room 310*a*. The screener can ask questions and verify information as required in order to screen both the question being asked and the demeanor of the attendee asking the question.

In some embodiments, the integration controller 102 at step 710 further sends commands to the online conference platform 104 to automatically unmute the attendee's microphone and turn on the attendee's web cam upon entering the online screener room 310*a*. In some embodiments, the attendee's web browser will present a question dialog box requiring the user to confirm the turning on of the microphone and web cam as triggered by the integration controller 102 (i.e., to allow the user to authorize the integration controller to control the on/off status of the attendee's webcam and mic). Having the attendee's microphone and web cam automatically activated (with optional user dialog confirmation) is beneficial to avoid wasted time of the screener not being able to hear and/or see the attendee after the attendee enters the online screener room 310*a*.

At step 712, the processors 200 determine whether the screening is completed. This may be done by the processors 200 receiving a message from the computing device 114 of the screener, where the message will indicate either a screening result such as a revised question wording, a grading for the question and optionally a comment, or will include an instruction for the integration controller 102 to delete the question if the question or attendee is not suitable at all.

At step 714, the processors 200 store the screened question (i.e., the revised question wording) along with the grading and comment from the screener on the question queue 228. Assuming the question is graded by the screener as being suitable to be asked during the meeting, the question status is also updated to be 'screened'. Alternatively, if the screener determined that the question was unsuitable, the processors 200 update the question status to be 'deleted'.

At step 716, the processors 200 pass the broadcast room livestream 322 to the attendee's computing device so the attendee can continue to watch and listen to the meeting in progress. Similar to step 710, this may be done by the processors 200 updating the source of the iframe to be the network address of the broadcast room stream 322 provided by the streaming service 110.

At step 718, the processors 200 command the online conference platform 104 to disconnect and optionally delete the new user that was created at step 708. The disconnection command sent by the processors 200 to the online conference platform 104 ensures that the attendee is no longer within the online screener room 310*a* (i.e., cannot listen to or watch the screener screening a next attendee's question).

The deletion of the new user account on the online conference platform 104 may optionally be performed to save resources and possibly expense incurred on the online conference platform 104. Especially if the question was deemed unsuitable to be asked during the meeting (and/or if the attendee was deemed unsuitable to ask a question during the meeting), the integration controller 102 may command the online conference platform 104 to the delete the user entirely. However, if the question and attendee are screened and deemed suitable, then the temporary user account may be maintained even though the user is not currently in any online rooms on the online conference platform 104. The online conference platform 104 user identifier may be stored in the users table 226 because this platform-specified user identifier will be used later when the user is moved into the online main conference room 300*a* when it comes time for the attendee to actually ask their question to the meeting presenters or otherwise speak and be heard in the main conference room 300.

At step 720, the processors 200 look up the telephonic conference platform user ID for the attendee associated with the unscreened question determined at step 702. This may be done by the processors 200 querying the users table 226 to find the value in the "Conference platform user identifier" column for the attendee associated with the unscreened question determined at step 702.

At step 722, the processors 200 command the telephonic conference platform 106 to move the attendee identified by the ID looked up in step 720 to the telephonic screener room 310*b* associated with the screener found available at step 704. The screener user themselves will generally be in the online screener room 310*a* (hosted by the online conference platform 104); however, because the integrated screener room 310 includes and passes the audio from both the online screener room 310*a* and the telephonic screener room 310*b* therebetween, by moving the attendee identified by the ID looked up in step 720 to the telephonic screener room 310*b* associated with the screener found available at step 704, both the attendee and the screener are able to hear each other and discuss the question for screening purposes within the integrated screener conference room 310.

In some embodiments, the integration controller 102 at step 722 further sends commands to the telephonic conference platform 106 to automatically unmute the attendee's voice audio upon entering the telephonic screener room 310b. This allows the screener to hear the attendee and is beneficial to avoid wasted time of the screener not being able to hear the attendee after the attendee enters the telephonic screener room 310b.

To allow easily moving the attendee back to the same telephonic broadcast room 324 when finished screening, the processors 200 may also at step 722 temporarily save in the users table 226 the room code for the telephonic broadcast room 324 from which the attendee is moved.

At step 724, the processors 200 determine whether the screening is completed. Similar to step 712, this may be done by the processors 200 receiving a message from the computing device 114 of the screener, where the message will indicate either a screening result such as a revised question wording, a grading for the question and optionally a comment, or will include an instruction for the integration controller 102 to delete the question if the question or attendee is not suitable at all.

At step 726, the processors 200 store the screened question (i.e., the revised question wording) along with the grading and comment from the screener on the question queue 228. This step is similar to step 714 previously described and a repeated description is omitted for brevity.

At step 728, the processors 200 command the telephonic conference platform 106 to move the attendee identified by the ID looked up in step 720 back to a telephonic broadcast room 324. In some embodiments, the telephonic attendee is moved back to the same telephonic broadcast room 324 in which they were originally located by the processors 200 passing the telephonic conference platform 106 the telephonic broadcast room code temporarily saved for the user in step 722. In other embodiments, the attendee is moved back to the current telephonic conference room 324 (i.e., the most recently created telephonic conference room 324 at step 438 that has not yet reached its maximum number of users at step 440).

Figure 8:
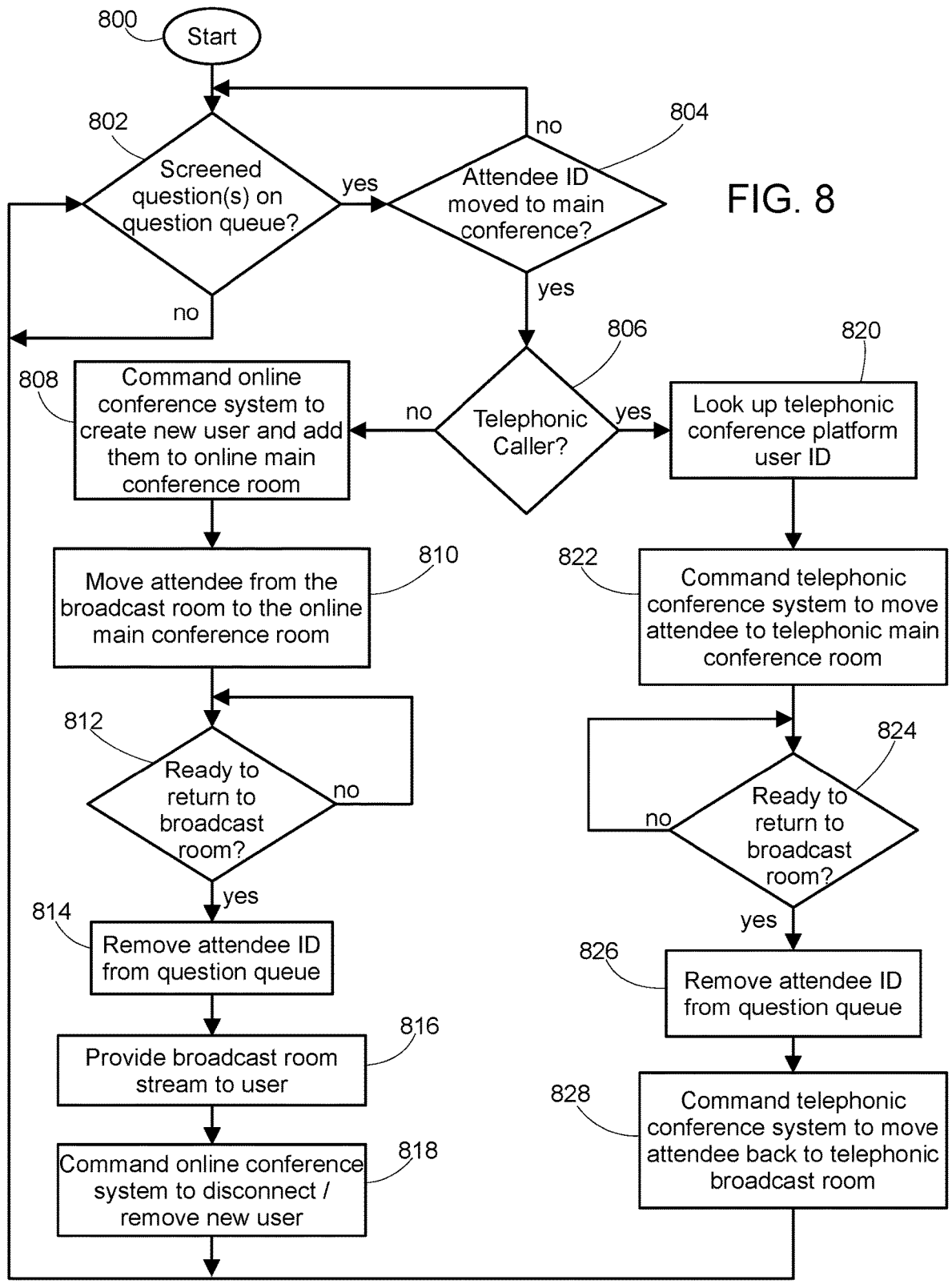
FIG. 8 illustrates a flowchart of a method of moving meeting attendees with screened questions into the main conference room for publicly speaking with the meeting presenters during the meeting according to an exemplary embodiment.

FIG. 8 illustrates a flowchart of a method of moving meeting attendees with screened questions into the main conference room 300 for publicly speaking with the meeting presenters during the meeting according to an exemplary embodiment. The steps of FIG. 8 may be performed by processors 200 of the integration controller 102 executing the moderator control software module 220 loaded from the storage device, for example. The steps of the flowchart are not restricted to the exact order shown, and, in other configurations, shown steps may be omitted or other intermediate steps added.

The process starts at step 800 and continues to loop until the meeting ends. In some embodiments, the start condition may correspond to when the first attendee joins a new meeting.

At step 802, the processors 200 determine whether there are one or more screened questions on the question queue 228. When yes, the processors 200 send information about the screened questions to moderator users—for example, by updating the list on the moderator UI webpage shown in FIGS. 12-13, for example. Control then proceeds to step 804; alternatively, when there are no screened questions on the question queue 228, control returns to step 702.

At step 804, the processors 200 determine whether a moderator user has selected one of the screened questions for moving to the main conference room 300. The selected one of the screened questions will correspond to a particular screened question asked by a particular attendee ID. The moderator may select a screened question from the list shown on the moderator UI webpage shown in FIGS. 12-13, for example. When an attendee ID with a screened question is selected for moving to the main conference room 300, control proceeds to step 806; alternatively, if no attendee ID is selected for moving to the main conference room 300 at this time, control returns to step 802 to update the screened questions list.

At step 806, the processors 200 determine the whether the attendee ID selected to move to the main conference room 300 at step 702 is a telephonic attendee 120 or an online attendee 118. This is done is some embodiments by the processors 200 looking up the attendee ID in the users table 226 to determine the value in the 'underlying conference platform' column. If the attendee is a telephonic attendee 120, control proceeds to step 820; otherwise, if the attendee is an online attendee 118, control proceeds to step 808.

At step 808, the processors 200 command the online conference platform 104 to create a new user and add the new user to the online main conference room 300a. As previously mentioned, in this embodiment, online attendees 118 who are in the broadcast room 320 are simply receiving a broadcast livestream 322 and are not actually real users taking up space in any conference room hosted by the online conferencing platform 104. Thus, in order to move the attendee who asked the question to the online main conference room 300a, the integration controller 102 accesses the online conference platform 104 to create a temporary user account and further sends one or more commands via the API or user interface of the online conferencing platform 104 to cause the temporary user account to join the online main conference room 300a of the meeting. Alternatively, in other embodiments, this step may also be changed to first look up the online conference platform 104 user ID of the user to see if they already have an account on the online conference platform 104—this can be done by the processors 200 querying the users table 226 based on the attendee ID to check the "conference platform user identifier" column. If the user already has an account, the processors 200 command the online conference platform 104 to move the attendee's existing user account to the online main conference room 300a.

At step 810, the processors 200 move the attendee from the broadcast room to the online main conference room. In some embodiments, this is done by passing an iframe of the new user in the online main conference room 300a from the online conference platform 104 to the attendee's 118 computing device 114. This step is similar to step 710 previously described except that now the source of the iframe is the URL for the temporary user account (created or looked up in step 808) in the main conference room 300a. The attendee's computer 114 now renders within the iframe the video chat meeting interface for their user in the online main conference room 300a.

In some embodiments, the integration controller 102 at step 810 further sends commands to the online conference platform 104 to automatically mute the attendee's microphone and turn off the attendee's web cam upon entering the online main conference room 300a. This is beneficial to all the attendee join to the main conference room 300a a bit earlier than needed in order for them to get ready. Especially in cases where there may be some lag or delay on the broadcast stream 322, it is beneficial to allow an attendee with a screened question to join the main conference room 300 a bit before they need to ask the question so they can get synced up on the audio and video and ready themselves. The moderator can then activate the attendee's web cam/microphone when it's time for the attendee to actually ask the question. Again, there may be a popup or other dialog requesting the attendee to give permission to moderator to turn on the web cam and microphone. In preferred embodiment, this popup is presented to the attendee upon either entering the screening room or joining the main online conference room 300*a* if no screening rooms are active.

At step 812, the processors 200 determine whether it is time to return the meeting attendee asking the question back to the broadcast room 320. This may be done by the processors 200 receiving a message from the computing device 114 of the moderator, where the message will indicate the attendee ID to move from the main conference room 300 back to the broadcast room 320.

At step 814, the processors 200 remove the attendee ID from the question queue 228. In some embodiments, the question is not actually deleted from the queue 228 but is instead marked with an updated status of "asked". In this way, the question is removed from the moderator lists of screened questions ready to be asked but a history of the question is still kept for reporting and auditing purposes if needed.

At step 816, the processors 200 pass the broadcast room livestream 322 to the attendee's computing device 114 so the attendee can continue to watch and listen to the meeting in progress. Similar to steps 710/716 previously described, this may be done by the processors 200 sending one or more packets to the attendee's web browser to update the source of the iframe to be the network address of the broadcast room stream 322 provided by the streaming service 110.

At step 818, the processors 200 command the online conference platform 104 to disconnect and optionally delete the new user that was created at step 708. Similar to as described in step 718, the deletion of the new user account on the online conference platform 104 may optionally be performed to save resources and possibly expense incurred on the online conference platform 104. However, if the attendee ID has further unscreened (or screened) questions remaining on the question queue 228, then the temporary user account may be maintained despite the user not being currently in any rooms of the online conference platform 104.

At step 820, the processors 200 look up the telephonic conference platform user ID for the attendee associated with the screened question selected at step 804. This may be done by the processors 200 querying the users table 226 to find the value in the "Conference platform user identifier" column for the attendee ID determined at step 804.

At step 822, the processors 200 command the telephonic conference platform 106 to move the attendee identified by the ID looked up in step 820 to the telephonic main conference room 300*a* for the meeting. Regardless of whether the presenters and other users in the main conference room 300 are in the telephone main conference room 300*b* or the online main conference room 300*a*, because the integrated main conference room 300 includes and passes the audio from between both the online and telephonic main conference rooms 300*a,b*, by moving the attendee identified by the ID looked up in step 820 to the telephonic main conference room 300*b*, both the attendee and the various presenters in the meeting are able to hear each other and discuss the question within the integrated main conference room 300.

In some embodiments, the integration controller 102 at step 822 further sends commands to the telephonic conference platform 106 to automatically mute the attendee's voice audio upon entering the telephonic main conference room 300*b*. This allows the attendee to be added to the telephonic main conference room 300*b* a bit earlier in order to get synced on the audio (if there is any lag in the other rooms) and to be ready to speak when unmuted by the moderator.

To allow easily moving the attendee back to the same telephonic broadcast room 324 when finished screening, the processors 200 may also at step 822 temporarily save in the users table 226 the room code for the telephonic broadcast room 324 from which the attendee is moved.

At step 824, the processors 200 determine whether it is time to move the attendee back to the broadcast room 320. Similar to step 812, this may be done by the processors 200 receiving a message from the computing device of the moderator.

At step 826, the processors 200 remove the attendee ID from the question queue 228. This step is similar to step 814 previously described and a repeated description is omitted for brevity.

At step 828, the processors 200 command the telephonic conference platform 106 to move the attendee identified by the ID looked up in step 820 back to a telephonic broadcast room 324. In some embodiments, the telephonic attendee 120 is moved back to the same telephonic broadcast room 324 in which they were originally located by the processors 200 passing the telephonic conference platform 106 the telephonic broadcast room code temporarily saved for the user in step 822. In other embodiments, the attendee is moved back to the current telephonic conference room 324 (i.e., the most recently created telephonic conference room 324 at step 438 that has not yet reached its maximum number of users at step 440).

Figure 9:
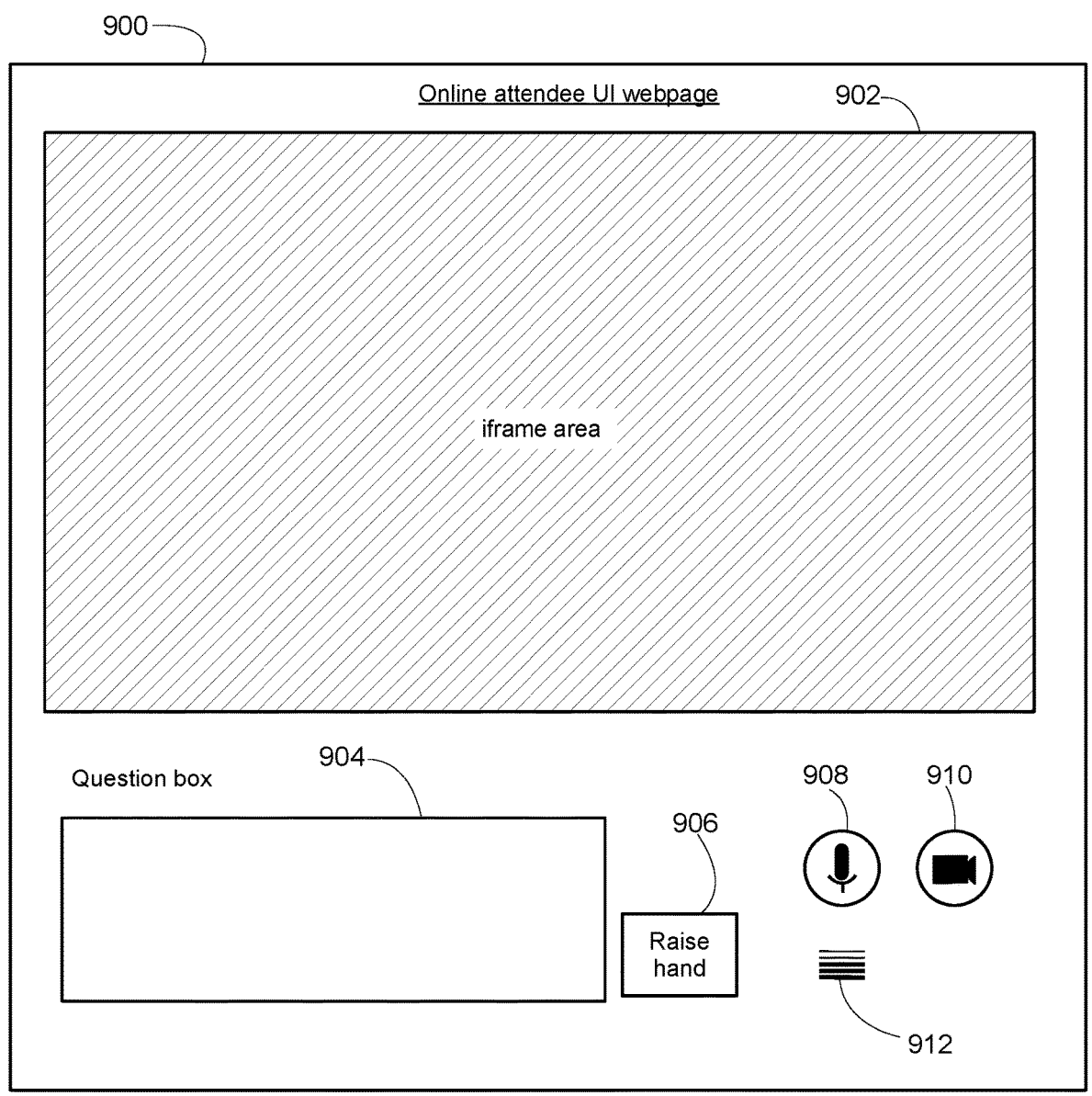
FIG. 9 illustrates an attendee user interface (UI) screen with iframe area allowing the integration controller of FIG. 1 to move an online attendee between the broadcast room hosted by the streaming service and the various online conference rooms hosted by the online conference platform according to an exemplary embodiment.

FIG. 9 illustrates an attendee user interface (UI) screen 900 being a webpage including an iframe area 902 with customization source allowing the integration controller 102 to move an online attendee 120 between the broadcast room 320 hosted by the streaming service 110 and the various online conference rooms 300*a*, 310*a* hosted by the online conference platform 104 according to an exemplary embodiment.

As illustrated, the attendee UI webpage 900 in this embodiment includes an inline frame element (iframe) area 902, a question box 904, a raise hand button 906, a microphone on-off button 908, a webcam on-off button 910, and an audio level indicator 912. The hypertext markup language (HTML) for forming the online attendee UI webpage 900 may be generated and sent to the user by the webserver software module 216 executed by the processors 200 of the integration controller 102.

In some embodiments, an online meeting attendee 118 firstly navigates their web browser to a network address of the webserver 216 of the integration controller 102. The address may be a so-called magic link that include one or more parameters for identifying the meeting to which the attendee wishes to join. The attendee then logs in and is authenticated as a valid user for the designated meeting. Two-factor authentication may be employed by the integration controller 102 to improve security by making sure joining attendees are who they claim to be. Once those formalities are finished, the webserver 216 sends HTML code to the web browser of the online attendee 118 to cause the web browser to display the UI webpage 900 of FIG. 9.

Initially the online attendee 118 is in the broadcast room 320 and therefore the webserver 216 sets the source of the iframe 902 to be the network address of the broadcast livestream 322 for the meeting as provided by the streaming service 110. In this way, while viewing the UI webpage 900 of FIG. 9, the livestream 322 of the meeting plays within the iframe area 902. The various other UI controls such as the question box 904 and raise hand button 906 remain available to the user to ask a question while watching the stream 322 in the iframe 902.

Upon typing a question into the question box 904 and clicking the raise hand button 906, the webserver 216 of the integration controller 102 receives a message from the attendee's computing device 114 and the processes previously described for adding the question to the question queue 228 (FIG. 6) and for selecting and moving the attendee with the unscreened question to a screener room 310 (FIG. 7) are performed.

To move the online attendee 118 to an online screener room 310a and allow them to actually see the screener's video and hear the screener's audio, the webserver 216 of the integration controller 102 at step 710 updates the source of the iframe element 902 so that the contents of the iframe area 902 on the UI webpage 900 changes. Specifically, the source of the iframe 902 is changed to the network address of the new user in the online screener room 310a from the online conference platform 104. Changing the iframe 902 source in this manner causes an online screener room 310a user interface (UI) for the new user to execute within the iframe area 902 when the updated webpage is rendered by the browser application running on the computing device 114 of the online meeting attendee 118.

Likewise, to later move the online attendee 118 to the online main conference room 300a and allow them to actually see the online main conference room 300a audio and video, the webserver 216 of the integration controller 102 at step 710 updates the source of the iframe element 902 to the network address of the new user in the online main conference room 300a from the online conference platform 104.

Although shown as one UI webpage 900 where the only thing that is changed between different iterations of the screen 900 is the iframe 902 source, other elements of the UI webpage 900 may also be changed as well depending on which room 300, 310, 320 the attendee is in. For instance, the online attendee UI webpage 900 may be different for each of the three room states illustrated in FIG. 5. However, regardless of how many different UI webpage 900 webpages are used, in some embodiments each webpage includes a page element such as iframe 902 that has a source that corresponds to what room 300, 310, 320 the attendee is currently located. The source of the page element (e.g., iframe 902) is the broadcast livestream 322 when the attendee is in the broadcast room 320. The source of the page element (e.g., iframe 902) is an online screening room 310a hosted by the online conference platform 104 when the attendee is in a screening room 310. Lastly, the source of the page element (e.g., iframe 902) is the online main conference room 300a hosted by the online conference platform 104 when the attendee is in the main conference room 300.

Figure 10:
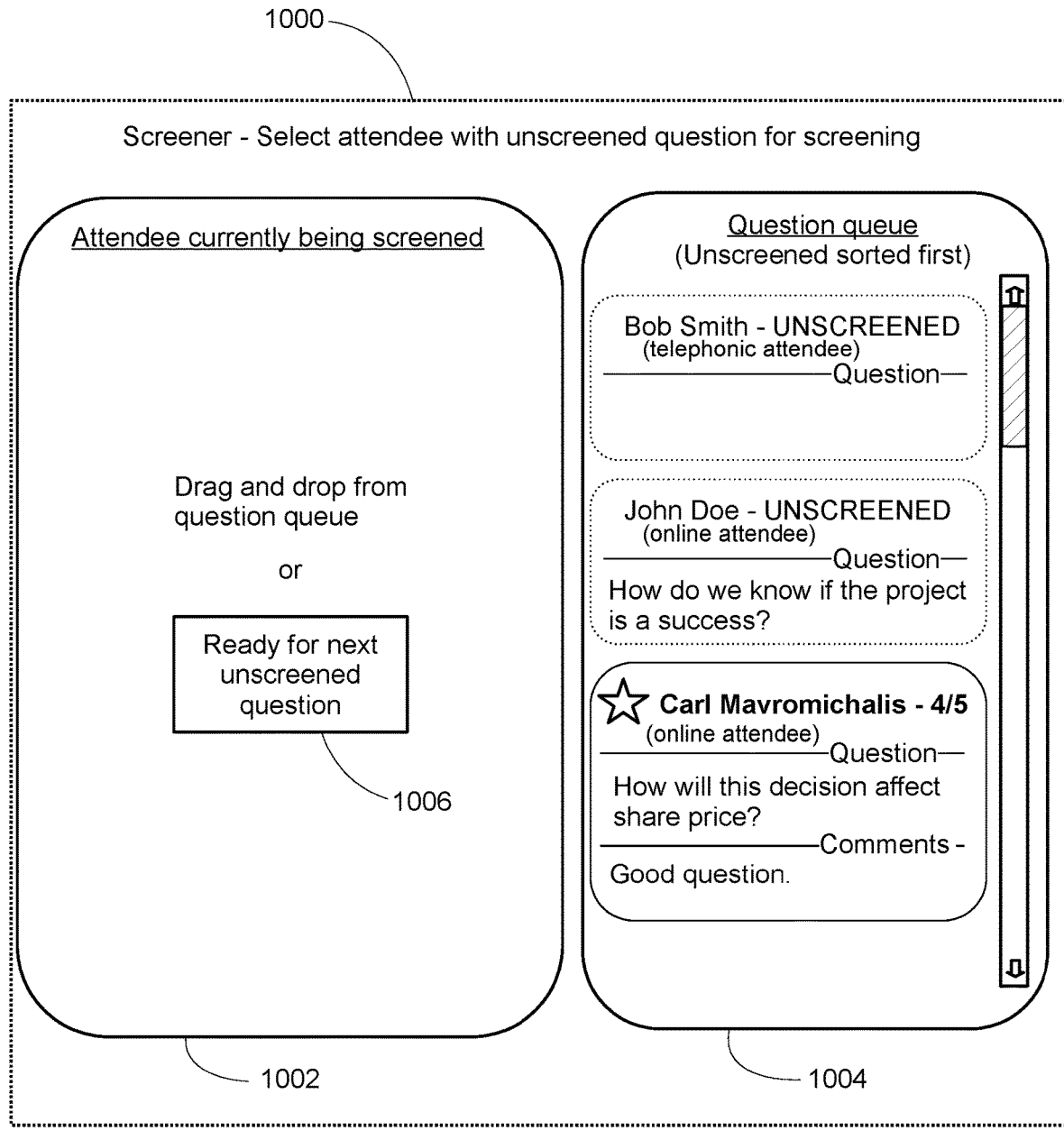
FIG. 10 illustrates a screener UI webpage for selecting attendees with unscreened questions listed on the question queue for screening purposes according to an exemplary embodiment.

FIG. 10 illustrates a screener UI webpage 1000 for selecting attendees with unscreened questions listed on the question queue 228 for screening purposes according to an exemplary embodiment. The screener UI webpage 1000 in this embodiment includes two main areas: a first area 1002 for showing information about an attendee currently being screened and a second area 1004 for showing unscreened questions remaining on the question queue 228. The questions of the question queue 228 are listed in the second area 1004 ordered with the unscreened questions shown on top because these are the question of primary interest to screeners. The order of the unscreened questions on the queue 228 may be changed at any time by the screener dragging and dropping the unscreened questions into a new order within the second area 1004. If there are multiple screeners working in the meeting, then each screener will see their own UI webpage and, in some embodiments, a change to the order of questions by a first screener user will cause an update to the order of the questions shown for the UI webpages 900 of the other screener users.

To select a particular question for screening, the screener has two options—they can either drag and drop a particular one of the questions from the queue 228 from the second area 1004 to the first area 1002. Alternatively, the screener may simply click the "ready for next unscreened question" button 1006 to have the integration controller 102 automatically select the top unscreened question from the list. Both of these ways to select an unscreened question and associated meeting attendee for screening purposes are options related to step 704 "screener available?" Once a particular attendee ID is selected for screening using either of these options, control of the flowchart of FIG. 7 proceeds to step 706 for the selected attendee ID.

Figure 11:
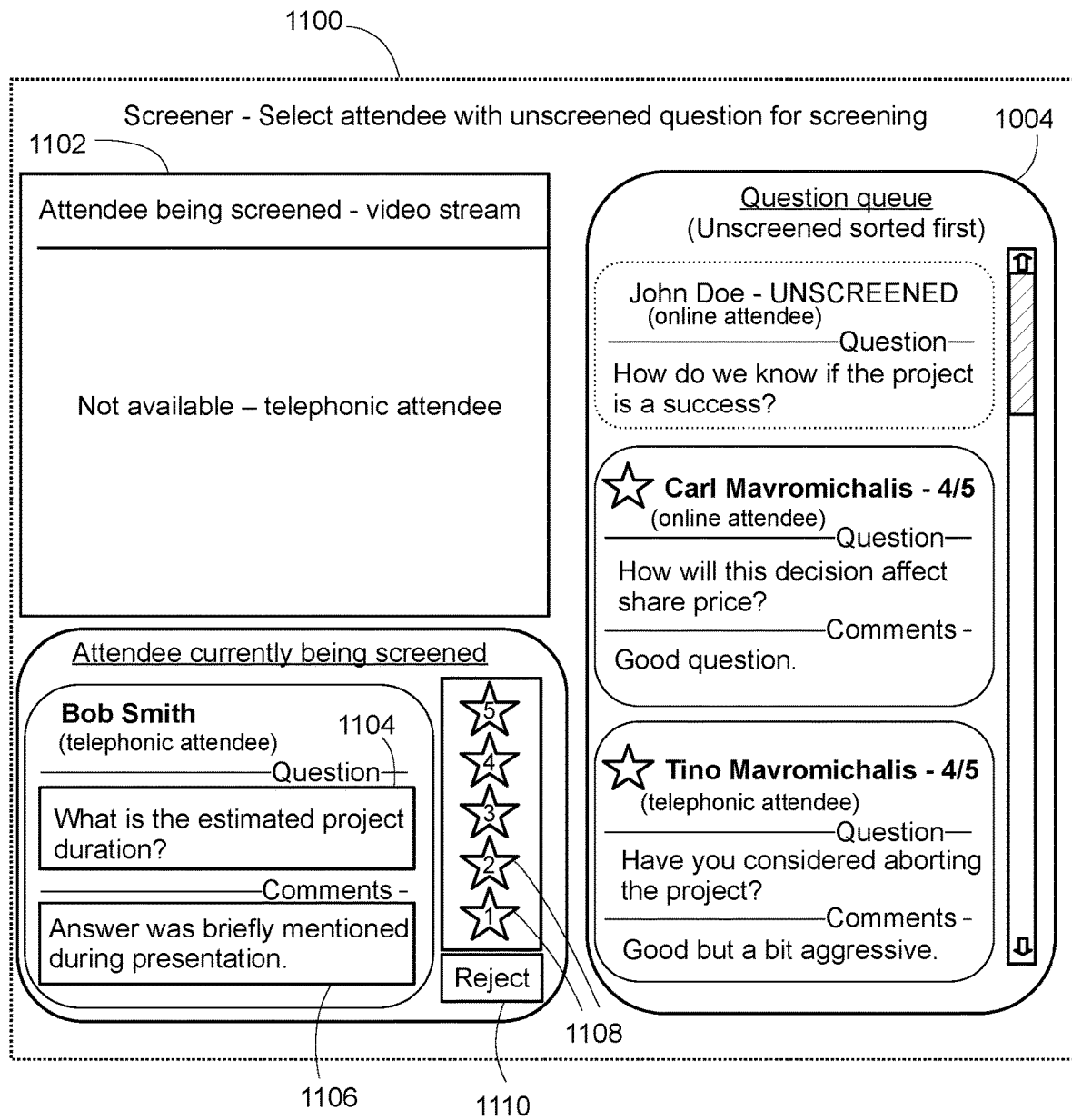
FIG. 11 illustrates a screener UI webpage for meeting with an attendee in a private screener room and evaluating the attendees unscreened question according to an exemplary embodiment.

FIG. 11 illustrates a screener UI webpage 1100 for meeting with an attendee in a private screener room 310 and evaluating the attendees unscreened question according to an exemplary embodiment. As illustrated, after selecting an attendee for screening, either by drag-and-drop or pressing the 'ready for next unscreened question' button 1006, the screener UI webpage 1100 is updated to show a video stream 1102 from the user in the online screener room 310a (if they are an online attendee 118) along with UI elements for modifying the question text 1104, adding a comment 1106, adding a grading 1108, or rejecting the question entirely 1110.

In this embodiment, the screener will always hear the audio of the attendee due to both the attendee and the screener being in the integrated screener room 310, which includes audio from both the underlying online screener room 310a and telephonic screener room 310b. However, in the event the attendee is a telephonic attendee 120, the screener will not have a video preview 1102 of the attendee 120.

After discussing the question with the attendee, the screener can update the question text in box 1104 and/or add a comment in box 1106 and then click one of the stars 1108 to grade the question and marked it with a status of "screened" in the question queue 228. Alternatively, the screener may instead click the reject button 1110 to marked the question with a status of "deleted" (or "rejected") in the question queue 228. The attendee is thereafter moved back to the broadcast room 320 since screening is completed (steps 712/724 of FIG. 7).

Figure 12:
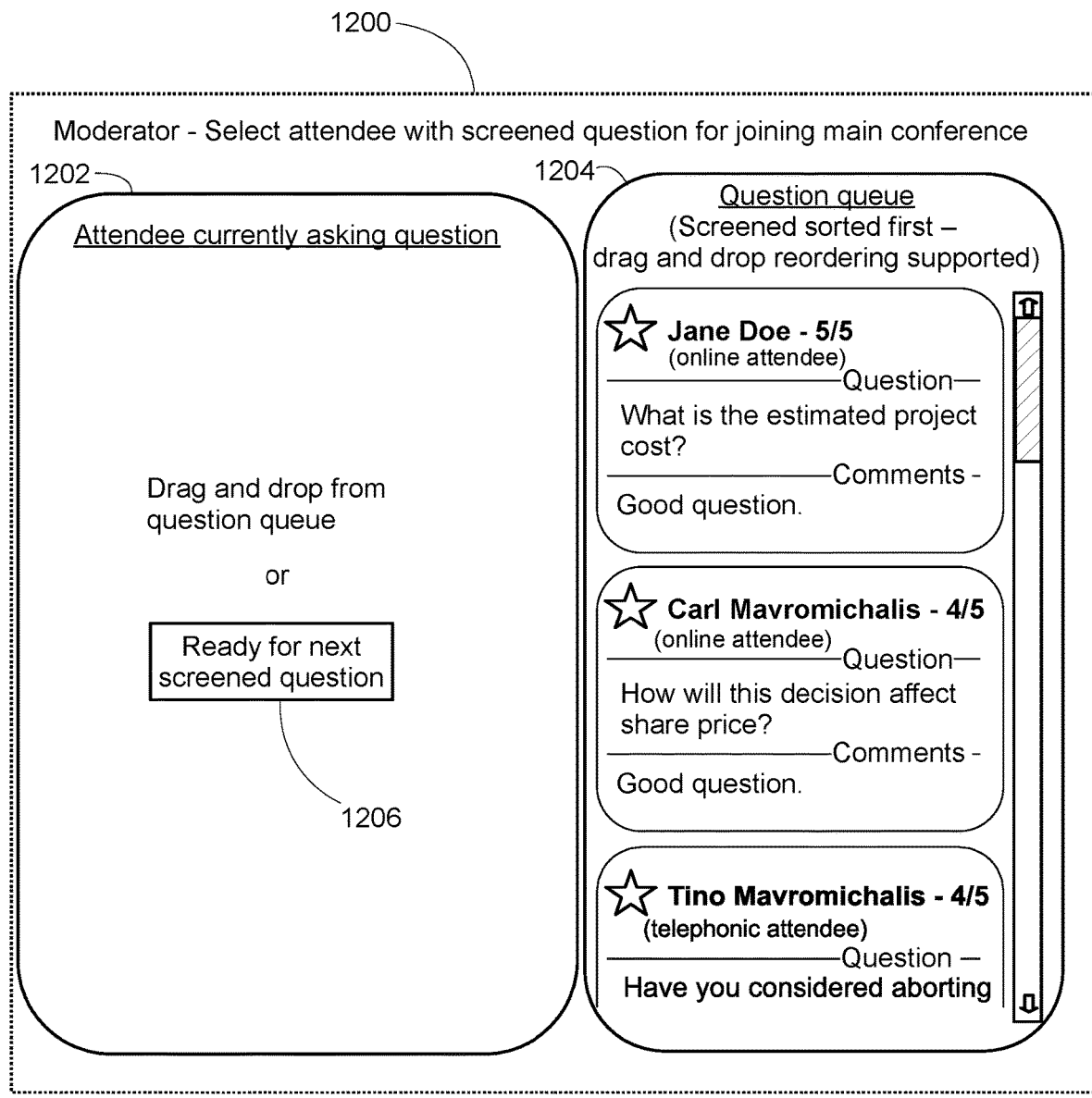
FIG. 12 illustrates a moderator UI webpage for selecting attendees with screened questions listed on the question queue to move to the main conference room according to an exemplary embodiment.

FIG. 12 illustrates a moderator UI webpage 1200 for selecting attendees with screened questions listed on the question queue 228 to move to the main conference room 300 according to an exemplary embodiment. Similar the screener UI 1000 of FIG. 10, the moderator UI webpage 1200 in this embodiment includes two main areas: a first area 1202 for showing information about an attendee currently asking a question in the main conference room 300 and a second area 1204 for showing screened questions remaining on the question queue 228. The questions of the question queue 228 are listed in the second area 1204 with the screened questions shown on top because these are the question of primary interest to moderators. The order of the screened questions on the queue 228 may be changed at any time by the moderator dragging and dropping the screened questions into a new order. If there are multiple moderators working in the meeting, then each moderator will see their own UI webpage 1200 and, in some embodiments, a change to the order of questions by a first moderator user will cause an update to the order of the questions shown for the UI webpages 1200 of the other moderators users.

To select a particular attendee for moving to the main conference room 300, the moderator has two options—they can either drag and drop a particular one of the questions from the queue 228 from the second area 1204 to the first area 1202. Alternatively, the moderator may simply click the "ready for next screened question' button 1206 to have the integration controller 102 automatically select the top screened question from the list in the second area 1204. Both of these ways to select a screened question and associated meeting attendee for moving to the main conference room 300 are options related to step 804 "attendee ID moved to main conference?" Once a particular attendee ID is selected using either of these options, control of the flowchart of FIG. 8 proceeds to step 806 for the selected attendee ID.

Figure 13:
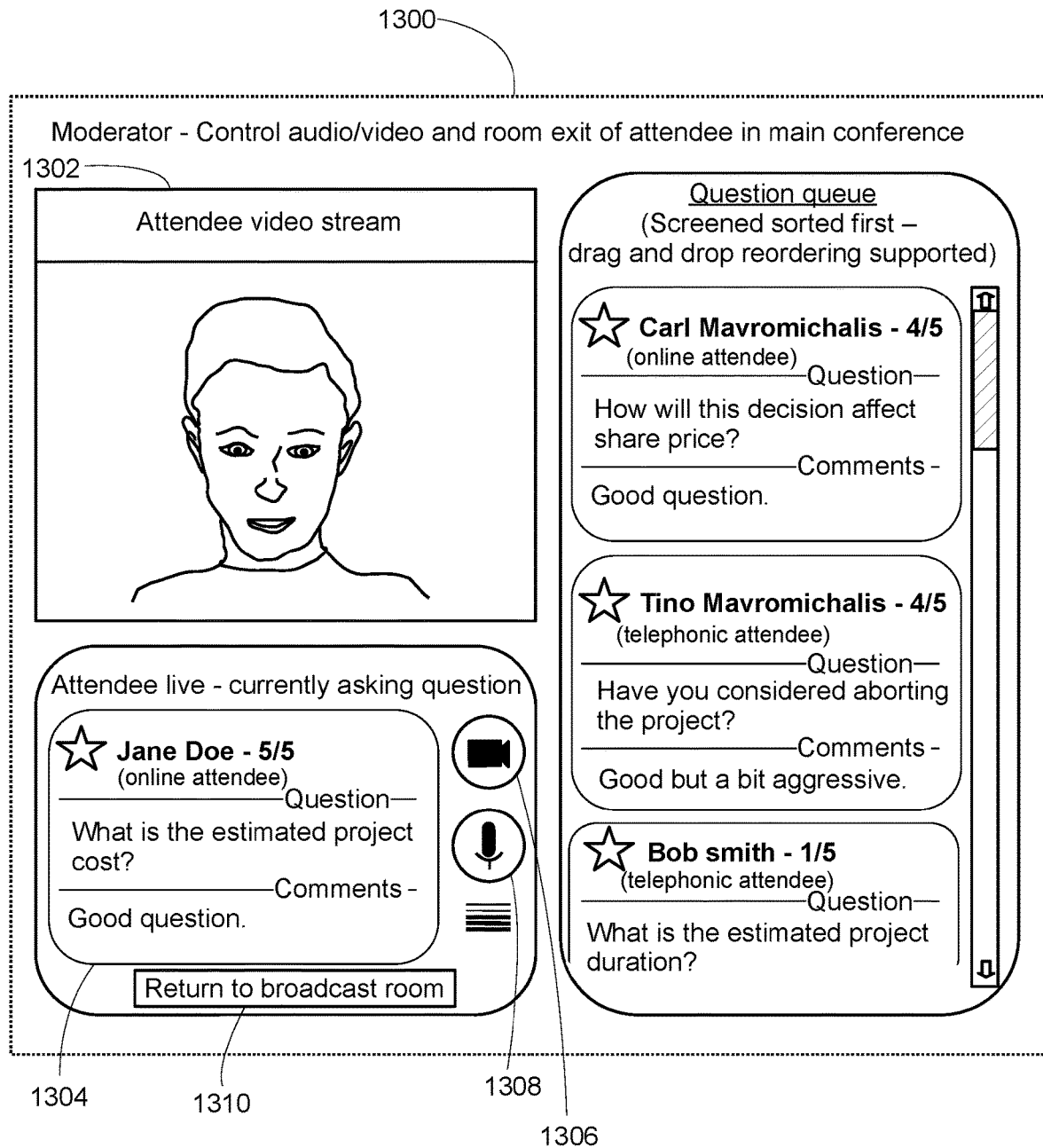
FIG. 13 illustrates a moderator UI webpage for controlling the audio and video of an attendee asking a screened question in main conference room and moving the attendee back to the broadcast room when they are done asking their question according to an exemplary embodiment.

FIG. 13 illustrates a moderator UI webpage 1300 for controlling the audio and video of an attendee asking a screened question in main conference room 300 and moving the attendee back to the broadcast room 320 when they are done asking their question according to an exemplary embodiment. As illustrated, after selecting an attendee, either by drag-and-drop or pressing the 'ready for next screened question' button 1206, the moderator UI webpage 1300 is updated to show a video stream 1302 from the user in the online main conference room 300a (if they are an online attendee 118) along with information 1304 about the screened question and UI elements 1306, 1308 for turning on and off the attendee's microphone and web cam, and a button 1310 returning the attendee to the broadcast room 320 when they are finished asking their question.

In this embodiment, when the attendee's microphone is unmuted, the moderator (and other people in the online/telephonic main conference rooms 300a,b and people watching the meeting on the broadcast live stream 322) will hear the audio of the attendee due to these participants being in the integrated main conference room 300, which includes audio from both the underlying online main conference room 300a and telephonic main conference room 300b. However, in the event the attendee is a telephonic attendee 120, the moderator (and other people in the online main conference room 300a and people watching the meeting on the broadcast live stream 322) will not have video 1302 of the attendee asking the question).

While the attendee is in the main conference room 300, the moderator has control over turning on and off the attendee's microphone and web cam utilizing the UI control elements 1306, 1308 on the moderator screen 1300. When it is time for the attendee to speak, the moderator can turn on the attendee's microphone and web cam; likewise, when it is not time of the attendee to speak, or if the moderators decides to cut of the attendee, the moderator can turn off the attendee's microphone and web cam.

After the attendee is finished discussing the question with the presenters and/or other attendees in the main conference room 300, the moderator can click the "return to broadcast room" button 1310, which causes the integration controller 102 to mark the question with a status of "asked" in the question queue 228. The attendee is thereafter moved back to the broadcast room 320 (see the "yes" branch of steps 812/824 of FIG. 8).

In some embodiments, the main conference room 300 is where the speakers are and each screener has a breakout room 310, which is an internal private conference room where an operator can discuss an attendee's questions with the attendees prior to moving the attendees to the main conference room 300. For web attendee 118, the online broadcast room 320 is the livestream 322 of the online main conference room 300a, and in some embodiments the livestream 322 may be channeled to a streamer service such as Vimeo™ livestream and delivered to the online attendees 118. For voice call attendees 120, the broadcast room 320 is a room 324 that attendees can listen to the audio track of the main conference room 300, and all attendees in this room 324 are muted.

During a meeting, the attendees are not able to speak or ask any question in the broadcast room 320. To ask a question, they can raise their hands and screeners can interact with them and give them an opportunity to join the main conference room 300 to ask their questions. The question queue 228 is designed to help in this process. The above FIGS. 6-8 illustrate the question flow according to some embodiments. The question flow can also be by-passed (as configured during setup for either the whole meeting or for one or more specific attendee IDs) if the conference organizer is comfortable with having attendees submit their unscreened questions into the meeting.

An attendee joins a meeting in a broadcast room 320, and the attendee cannot speak in the broadcast room 320. To speak or ask a question, an attendee can raise his/her hand. The raised hand attendee is assigned to the question queue 228. The screener set their status as 'Ready' to receive a questioner. When they are set to 'Ready', a questioner will automatically be assigned to their breakout room 310 where the attendee and screener can speak one-on-one to discuss the question. The screener performs a qualitative assessment of the attendee and enters the question into the system via question box 1104, provides a grade to the attendee, and moves the attendee back to the broadcast room 320. In some embodiments, this function may be performed with an automated speech-to-text processor or software service. At the same time, the attendee is still listed on the question queue 228. While the screener status is in 'Ready' status, the next attendee is auto assigned to the screener when the screener finishes talking to the current attendee.

The moderator or producer sees the screened attendee in the question queue 228, along with the grade and the question of the attendee. The moderator or producer can move the attendee to the main conference room 300 when the attendee is deemed suitable to ask questions in the main question room 300. When the moderator is sure the attendee's question will be asked, s/he click a 'transfer' button that will move the attendee from the broadcast room to the main conference room. If an attendee has a low grade, the attendee may be removed from the question queue 228 without being granted the opportunity to speak in the main conference room 300. The screener, moderator or producer can also choose to move the attendee from the question queue 228 to the main conference room 300 without having the attendee pre-screened.

After speaking in the main conference room 300, the moderator/produce moves the attendee back to the broadcast room 320. The attendee can then raise their hand again if they have another question and start the process over.

Figure 14:
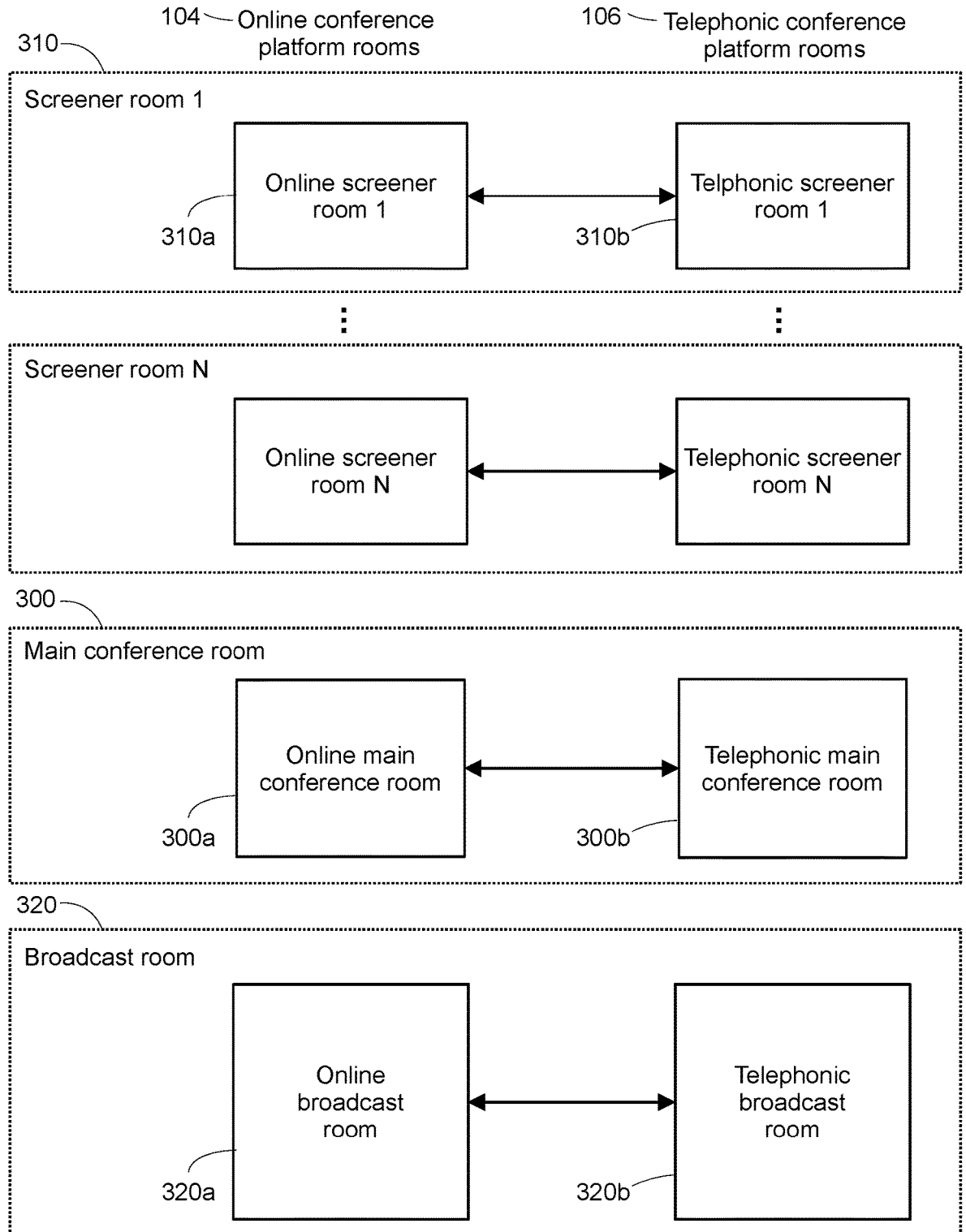
FIG. 14 illustrates a room correspondence diagram showing how a plurality of different integrated virtual conference rooms for conducting a meeting are formed by having both online and telephonic conference rooms created on the online conference platform and the telephonic conference platform for each integrated room according to an exemplary embodiment.

FIG. 14 illustrates a room correspondence diagram showing how a plurality of different integrated virtual conference rooms for conducting a meeting are formed by having both online and telephonic conference rooms created on the online conference platform 104 and the telephonic conference platform 106 for each integrated room according to an exemplary embodiment. In this embodiment, each integrated conference room is formed by a corresponding pair of underlying conference rooms—one hosted on the online conference platform 104 and one hosted on the telephonic conference platform 106. The two underlying conference rooms are joined such that audio from one is passed to the other and vice versa.

In contrast with the embodiment of FIG. 3, FIG. 14 is beneficial when there are no extra per-user charges for each user on the underlying conference platforms 104, 106 and likewise there are no hard limits to the number of users that may be presented in a single room on the underlying conference platforms 104, 106. In this embodiment, the integration controller 102 creates and joins the various rooms for a single meeting as illustrated in FIG. 14.

New online attendees 118 are initially placed into the online broadcast room 320a by the integration controller 102 commanding the online conference platform 104 to create a temporary user account for the user and then passing a network address for the user hosted on the online conferencing platform 104. This network address is used as the source for an iframe 902 or other page element similar to as described above when an online attendee 118 is moved into a screener room 310a (step 710) or into the main conference room 300a (step 810). Whereas in the previously described embodiment, online attendees 118 in the so-called broadcast room 320 were actually just watching a broadcast stream 322 provided by the streaming service 110 not actually in any room on the online conference platform 104, in the embodiment of FIG. 14, online attendees 118 in the broadcast room 320 are actually in an online broadcast room 320a hosted by the online conference platform 104.

In FIG. 14, all online attendees 118 have a user account and are in one of the online conference platform 104 rooms (i.e., online main conference room 300a, online screener room 310a, or online broadcast room 320a) hosted by the online conference platform 104. The streamer service 110 may therefore be omitted from the system in some embodiments that create an actual online broadcast room 320a such as shown in FIG. 14.

In other embodiments, combinations of the rooms and organization of both FIG. 3 and FIG. 14 may be employed by picking and choosing according to application specification user requirements. For instance, a single online broadcast room 320a may be utilized for online attendees 118 whereas as a plurality telephonic broadcast rooms 324, each with a fixed number of users, may be dynamically created as shown in FIG. 3 and described in the flowchart of FIG. 4.

Figure 15:
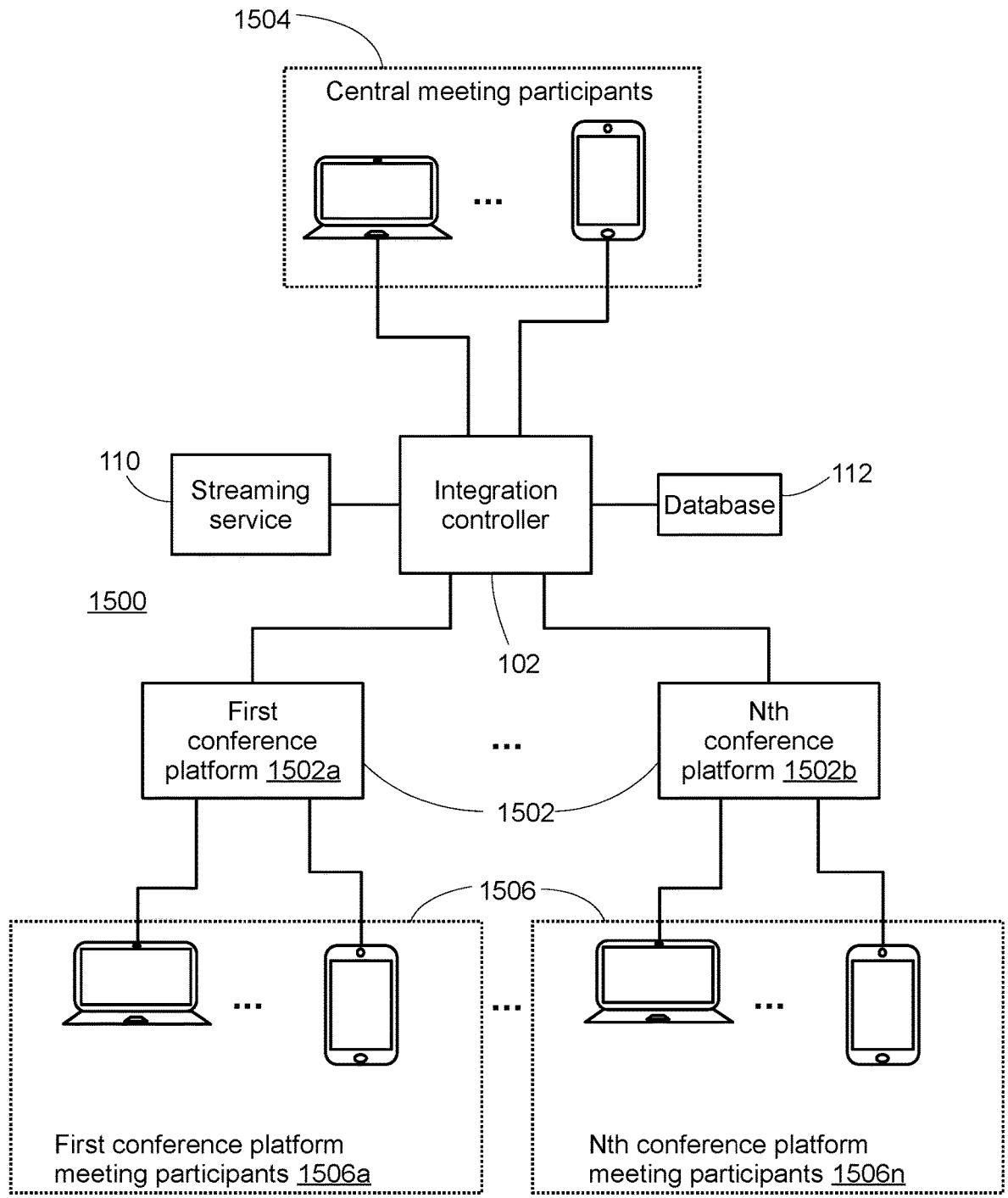
FIG. 15 illustrates a block diagram showing a system for integrating any number of different conference platforms to thereby form an integrated conference platform according to an exemplary embodiment of the invention.

FIG. 15 illustrates a block diagram showing a system 1500 for integrating any number of different conference platforms 1502 to thereby form an integrated conference platform according to an exemplary embodiment of the invention. Whereas FIG. 1 and the above examples only included two underlying conference platforms—an online conference platform 104 and a telephonic conference platform 106, FIG. 15 integrates any number of conference platforms 1502 in a similar manner.

The system 1500 includes an integration controller 102 coupled to a streaming service 110 and database 112 similar to as previously described. Central meeting participants 1504 (either staff or of attendees) join the meeting via the integration controller 102. Coupled to the integration controller 102 a plurality of different conference platforms 1502 including a first conference platform 1502a up to an Nth conference platform 1502n. Each conference platform 1502 may have their own meeting participants 1506 joining directly through the conference platform 1502—for instance, first conference platform meeting participants 1506a join via the first conference platform 1502a and Nth conference platform meeting participants 1506n join via the Nth conference platform 1502n.

The embodiment of FIG. 15 is particularly beneficial to take advantage of different features already supported and provided by a large number of existing conference platforms 1502. As one example of a possible application, the integration controller 102 may be coupled to a plurality of existing conference platforms 1502 including Twilio™, Zoom™, Skype™, MS Teams™, GoToMeeting™, Google Meet™, and Cisco Webex™. In this way, a single AGM or town hall meeting may be conducted and participants may join the meeting utilizing their preferred conference platform 1502. Likewise, separate and possibly different features supported by each of the different conference platforms 1502 may be utilized for the integrated meeting thereby allowing a range of different features depending on which underlying conference platform 1502 a particular attendee decides to use to join the meeting.

In an exemplary embodiment, the integration controller 102 commands each of the various conference platforms 1502, from the first conference platform 1502a to the Nth conference platform 1502n, to create a respective main conference room associated with a meeting. The controller 102 further commands at least one of the various conference platforms 1502 to join some number of the other conference platforms 1502 together such that audio is passed between all the respective main conference rooms, thereby forming an integrated main conference room 300. A similar process may be done by the integration controller 102 to create a screener room on each conference platform 1502 and then join them together to form an integrated screener room 310. A similar process may be done by the integration controller 102 to create a broadcast room on each conference platform and then join them together to form an integrated broadcast room 320 (like in FIG. 14)—or the broadcast rooms may be special in that they are streams 322 or separate listen-only rooms copied from the main conference room 300 on each conference platform 1502 (like in FIG. 3).

To work with the system of FIG. 15, the flowcharts of FIG. 7 and FIG. 8 generally are the same with steps 706 and 708 being modified to determine the specific underlying conference platform 1502 to which the attendee in question is joined. Each underlying conference platform 1502 may then have a sequence of steps similar to as shown in FIGS. 7 and 8 to move the attendee between rooms as required.

Beneficially, the integration controller 102 may consolidate functions/features and statistics of the various underlying conference platforms 1502 and also from attendees joining the meeting via the integration controller 102.

Voting functionality may be included in each of the different conference platforms 1502 and may be handled differently depending on each type of platform 1502. For instance, a telephone conference platform 106 may allow telephonic attendees 120 to vote utilizing touch tones whereas online attendees 118 may join the meeting via the integration controller 102 and vote utilizing UI controls on a webpage provided by the webserver 216 of the integration controller 102. The votes from each of the underlying conference platforms 104, 106, 1502 and/or from attendees in the online broadcast room 320 watching the livestream 322 (i.e., not actually in any room of an underlying conference platform 104, 106, 1502) are tabulated by the integration controller 102. For instance, the processors 200 may tabulate votes made by attendees during the meeting at least by accumulating telephone votes received from the telephonic conference platform 106 and also online votes received from received the webserver 216 of the integration controller 102. The telephonic votes correspond to the votes made by the telephonic attendees 120 and the online votes correspond to the online attendees 118 that joined the meeting via the integration controller 102. In this way, votes may be held during the meeting and all attendees may participate, even though different attendees are joining the meeting using different technology and providers.

Beneficially, custom functionality supported by specific underlying conference platforms 104, 104, 1502 may also be leveraged by the integration controller 102. For instance, custom telephonic features supported by a telephonic conference platform 106 may be utilized by the integration controller 102 to give a better experience for telephone attendees. Advanced features such as parallel and timed out-dialing of participants, automatic redialing, and touch-tone-based inputs for voting and asking questions may all be utilized during the meeting as controller by the integration controller 102 via APIs with the telephonic conference platform 106 while still allowing more modern Internet and video conferencing capabilities of other online conference platforms 104 to be utilized during the same meeting.

The integration controller 102, system and integrated conference in some embodiments beneficially allow attendees to join the meeting utilizing the technology (i.e., online/phone) of their choice and may in some embodiments further allow attendees to join utilizing the specific brand of conference platform 104, 106, 1502 of their choice.

Although the invention has been described in connection with preferred embodiments, it should be understood that various modifications, additions and alterations may be made to the invention by one skilled in the art without departing from the spirit and scope of the invention.

For example, webpage frames and in particular iframes 902 are described above as being the webpage element utilized to direct an attendee's web browser to different locations such as the address of the streamer service 110 or online conference platform 104. However, other types of page elements besides iframes 902 may be utilized for this purpose in a similar manner in other embodiments. For example, both AJAX and JavaScript may be utilized to retrieve data and inject it into a page. Certain HTML5 web components may also be utilized to bundle documents from other documents. In general, any suitable page element can be utilized to embed the streaming service 110's livestream 322 and/or the online conferencing platform 104's video into a page that still includes UI control elements 904, 906, 908, 910 for the attendee provided by the integration controller 102.

Although the above examples have focused on online attendees 118 joining the meeting utilizing a web browser running on the attendee's computing device 114, in other embodiments, a custom software application that is not a general purpose web browser may be utilized instead.

Figure 16:
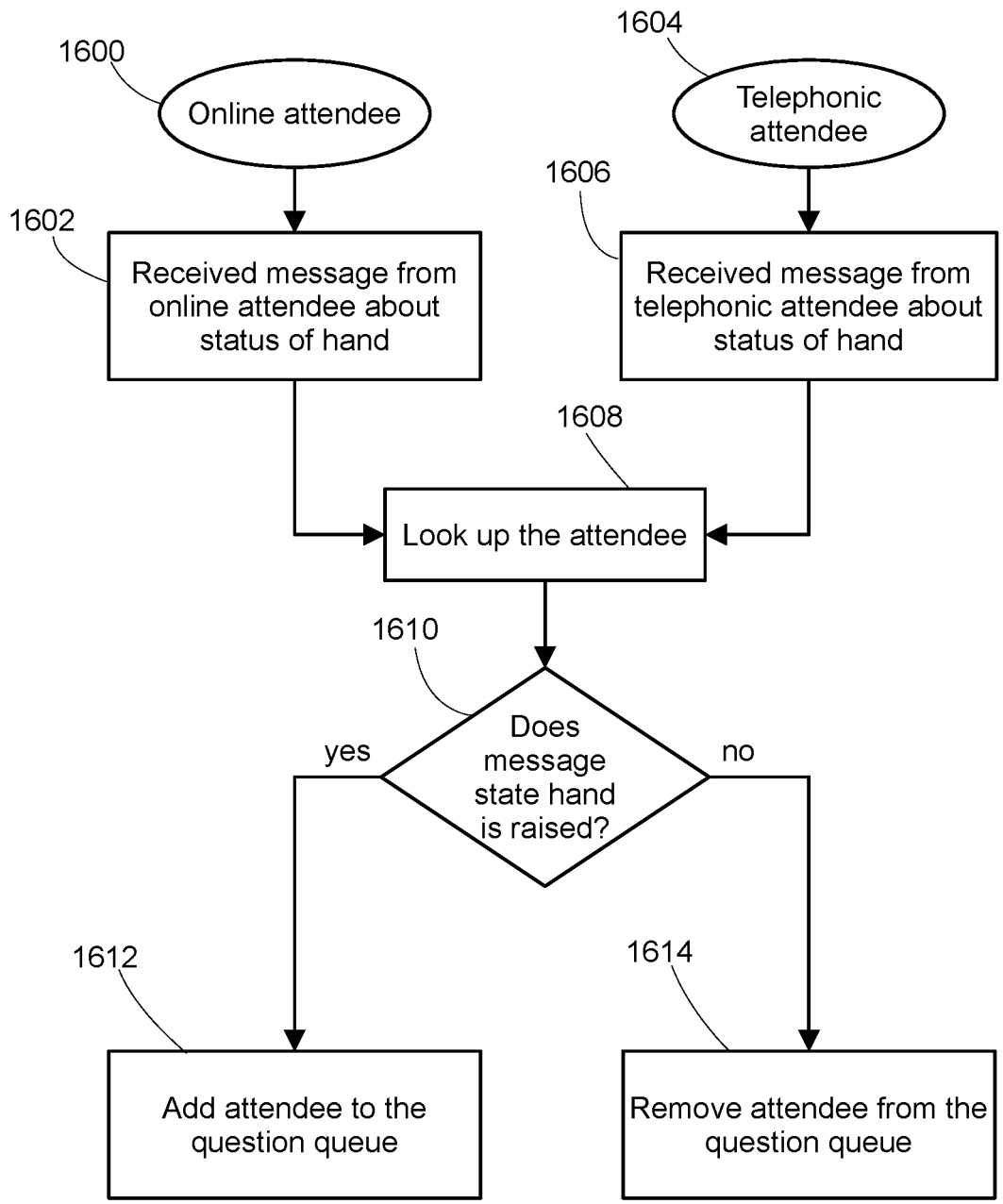
FIG. 16 illustrates an alternative flowchart of a method of processing an attendee virtually raising their hand to get on the question queue according to an exemplary embodiment.

In another example modification, rather than a high-level loop as shown in FIG. 6 for detecting and receiving messages indicating a participant has raised their hand, an interrupt based method may be implemented to perform similar functionality. For example, FIG. 16 illustrates an alternate flowchart of a method of processing an attendee virtually raising their hand to get on the question queue according to an exemplary embodiment. In this embodiment, actions by an online attendee 1600 (e.g., gestures, button presses, voice or audio signals, etc) trigger a message to be received at step 1602 about the status of that participant's hand. Similarly, actions by a telephonic attendee 1604 (e.g., touch tone button presses, voice or audio signals, etc) trigger a message to be received at step 1606 about the status of that participant's hand. (The term 'hand' here indicates a first virtual state of whether the user has a question to ask—i.e., hand raised, or has a second virtual state of not having a question to ask—i.e., hand is lowed.) At step 1608, the integration controller 102 looks up the attendee (e.g., in the users table 226) and then determines whether the message indicates the participant's hand is raised. When yes, controller proceeds to step 1612 to add the attendee to the question queue. Otherwise, when no, control proceeds to step 1614 to remove the attendee from the message queue.

In some embodiments, the screening function may be turned off at some point or for certain meetings as a user configurable setting. When the screening function is turned off, online attendees would submit their question by typing it into a popup window. Phone attendees would not have their questions screened. In some instances, an attendee won't go to a screening room at all. For instance, if a meeting organizer does not select screening rooms, a window will pop up and ask the online attendee to type their question in. Phone attendees will not be screened—just placed into the queue.

Although the above embodiment of FIG. 1 has focused on all online meeting participants 118 joining the meeting via the integration controller 102, in other embodiments, direct-entry online conference platform meeting participants 122 may also join a meeting directly through the online conference platform 104. For example, in embodiments where there is an online broadcast room 320a hosted by the online conference platform 104, direct-entry attendees 122 may simply join this room 320a in order to attend the meeting. Similar to how telephonic attendees 120 may receive an announcement or other instructions of how to raise their hand by pressing a touch tone, direct entry online attendees 122 may hear a similar announcement or be provided the instructions via written form upon joining.

In some embodiments, there may be a category of users referred to as an observer. An observer user is someone who can view the meeting but not interact—no raised hand, voting or transferring functionality. Observers are limited to observing the meeting in a read-only manner.

Although the above examples have shown joining an online conference room to a telephonic conference room to form an integrated conference room is done by the controller 102 sending commands to the telephonic platform 106 to call in to the online conference room, the joining of online and telephonic conference rooms can be done by either conference platform calling the other. In some embodiments, the room may be created first on the telephonic platform 106 and then the online platform 104 may call in to the telephonic platform 106 and join the newly created room. For example, let one of the online conference platform 104 and the telephonic conference platform 106 be referred to as a first conference platform and the other of the online conference platform 104 and the telephonic conference be referred to as a second conference platform. The one or more processors 200 may command the first conference platform to initially create a first main conference room and obtain a code from the first conference platform for identifying the first main conference room, command the second conference platform to call in to the first conference platform utilizing a call leg and join the first main conference room by passing the code from the second conference platform to the first conference platform via the call leg, and command the second conference platform to create a second main conference room based on the call leg. In this way, the first main conference room and the second main conference room are joined together to form the integrated main conference room 300 such that participant audio in the first main conference room is passed to the second main conference room and vice versa via the call leg. The same process may be used to form integrated screener rooms 310 and/or integrated broadcast rooms 320 as required.

In another example modification of the above way to form an integrated conference room, conference rooms on two platforms may be first created in an unjoined manner and then subsequently joined. For example, again let one of the online conference platform 104 and the telephonic conference platform 106 be referred to as a first conference platform and the other of the online conference platform 104 and the telephonic conference be referred to as a second conference platform. The one or more processors 200 may command the first conference platform to create a first main conference room and obtain a code from the first conference platform for identifying the first main conference room, and command the second conference platform to create a second main conference room. After the two rooms are created, the integration controller 102 then commands the second conference platform to call in to the first conference platform utilizing a call leg from the second main conference room and join the first main conference room by passing the code from the second conference platform to the first conference platform via the call leg. In this way, the first main conference room and second main conference room are joined together to form the integrated main conference room 300 such that participant audio in the first main conference room is passed to the second main conference room and vice versa via the call leg. The same process may be used to form integrated screener rooms 310 and/or integrated broadcast rooms 320 as required.

Although the above examples of moderator UI webpages 1200, 1300 have shown moving a single attendee with a screened question into the main conference room 300 at a time, in some embodiments the moderator can move multiple attendees into the main conference room 300 in a single operation. For example, five (or any desired number) of attendees may be simultaneously moved by a single moderator from the broadcast room 320 to the main conference room 300. Moving attendees in batches may be beneficial to reduce time requirements for the moderator and also give each individual attendee more time for their audio and video to sync up with the main conference room due 300 to the room change.

In some embodiments, while in a screener conference room 310, the audio of the integrated main conference room (i.e., the meeting audio) may be played in the background at a low volume level. This allows both the screener and the attendee in the screener room 310 to keep listen to the ongoing meeting.

In some embodiments, a deliberate delay may be added along with a message about the delay time left whenever an attendee is moved from one room to another. The deliberate delay may be around five to ten seconds long in some embodiments and the message may be along the lines of "you are now moving to <name of room> in 5, 4, 3, 2, 1".

During the delay period while switching rooms, the integration controller 102 may cut the audio and/or video feeds of the meeting to the attendee. In this way, the attendee will not be able to hear the meeting for a period of time while switching rooms. Because of the cut, it will thus be natural for the attendee to expect that their audio will not be synchronized from the room they were in to the room they have now moved. Adding a deliberate delay in this manner by the integration controller 102 masks any inherent audio delay or sync issues between the broadcast livestream 322 and the main conference room 300, for example.

In some embodiments, people who aren't verified when they call in to the teleconference platform 106 are handled in different ways. For instance, if someone calls in to the teleconference side 106, the integration controller 102 (or telephonic conference platform 106) verifies that their number is in a predetermined list. If it is not, they are placed into a listen-only mode until they speak with a screener who can verify their identity and legitimacy to join the meeting. Upon logging, they are automatically placed into the queue with the flag 'Anonymous'. This tells the screener to screen that person and verify their identity. They will jump the queue as well so they can be verified quickly. They are then placed back into the teleconference as a regular user who can vote and raise their hand.

The modules and/or associated algorithms shown and described above may be implemented by software executed by one or more processors 200 operating pursuant to instructions stored on a tangible computer-readable medium such as a storage device 202 to perform the above-described functions of any or all aspects of the integration controller 102. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 232. The processors 200 may be included in a general-purpose or specific-purpose computer that becomes the integration controller 102 or any of the above-described modules as a result of executing the instructions.

In other embodiments, rather than being software modules executed by one or more processors 200, the modules and/or associated algorithms shown and described above may be implemented as hardware modules configured to perform the above-described functions. Examples of hardware modules include combinations of logic gates, integrated circuits, field programmable gate arrays, and application specific integrated circuits, and other analog and digital circuit designs.

Functions of single modules may be separated into multiple units, or the functions of multiple modules may be combined into a single unit. For example, although the above examples have focused on the streaming service 110 being an external service accessed by the integration controller 102, in other embodiments the streaming service 110 may be provided by the integration controller 102 itself.

Unless otherwise specified, features described may be implemented in hardware or software according to different design requirements. In addition to a dedicated physical computing device, the word "server" may also mean a service daemon on a single computer, virtual computer, or shared physical computer or computers, for example.

All combinations and permutations of the above described features and embodiments may be utilized in conjunction with the invention.

What is claimed is:

1. A controller of a virtual conferencing system, the controller comprising:
   one or more storage devices storing therein a plurality of software instructions;
   one or more communications interfaces coupled to an online conference platform and a telephonic conference platform; and one or more processors coupled to the one or more storage devices and the one or more communications interfaces;

wherein, by the one or more processors executing the software instructions loaded from the one or more storage devices, the one or more processors are configured to:

command the online conference platform to create an online main conference room associated with a meeting;

command the telephonic conference platform to create a telephonic main conference room associated with the meeting; and command at least one of the online conference platform and the telephonic conference platform to join the online main conference room and the telephonic main conference room together such that audio in the online main conference room is passed to the telephonic main conference room and vice versa; wherein the online main conference room and the telephonic main conference room joined together form an integrated main conference room;

wherein one of the online conference platform and the telephonic conference platform is hereinafter referred to as a first conference platform;

another of the online conference platform and the telephonic conference is hereinafter referred to as a second conference platform; and the one or more processors are further configured to:

command the first conference platform to create a first main conference room and obtain a code from the first conference platform for identifying the first main conference room;

command the second conference platform to create a second main conference room; and command the second conference platform to call in to the first conference platform utilizing a call leg from the second main conference room and join the first main conference room by passing the code from the second conference platform to the first conference platform via the call leg; wherein the first main conference room and second main conference room are thereby joined together to form the integrated main conference room such that participant audio in the first main conference room is passed to the second main conference room and vice versa via the call leg.

2. The controller of claim 1, wherein:

one of the online conference platform and the telephonic conference platform is hereinafter referred to as a first conference platform;

another of the online conference platform and the telephonic conference is hereinafter referred to as a second conference platform; and the one or more processors are further configured to:

command the first conference platform to initially create a first main conference room and obtain a code from the first conference platform for identifying the first main conference room;

command the second conference platform to call in to the first conference platform utilizing a call leg and join the first main conference room by passing the code from the second conference platform to the first conference platform via the call leg; and command the second conference platform to create a second main conference room based on the call leg; wherein the first main conference room and the second main conference room are thereby joined together to form the integrated main conference room such that participant audio in the first main conference room is passed to the second main conference room and vice versa via the call leg.

3. The controller of claim 1, wherein the one or more processors are further configured to:

command the telephonic conference platform to create a first telephonic broadcast conference room associated with the meeting;

command the telephonic conference platform to configure the first telephonic broadcast room to be a listen-only room such that new attendees cannot speak in the first telephonic broadcast room; and command at least one of the online conference platform and the telephonic conference platform to forward audio from the integrated main conference room to the first telephonic broadcast room such that attendees of the first telephonic broadcast room can hear audio of the integrated main conference room.

4. A controller of a virtual conferencing system, the controller comprising:

one or more storage devices storing therein a plurality of software instructions;

one or more communications interfaces coupled to an online conference platform and a telephonic conference platform; and one or more processors coupled to the one or more storage devices and the one or more communications interfaces;

wherein, by the one or more processors executing the software instructions loaded from the one or more storage devices, the one or more processors are configured to:

command the online conference platform to create an online main conference room associated with a meeting;

command the telephonic conference platform to create a telephonic main conference room associated with the meeting;

command at least one of the online conference platform and the telephonic conference platform to join the online main conference room and the telephonic main conference room together such that audio in the online main conference room is passed to the telephonic main conference room and vice versa; wherein the online main conference room and the telephonic main conference room joined together form an integrated main conference room;

command the telephonic conference platform to create a first telephonic broadcast conference room associated with the meeting;

command the telephonic conference platform to configure the first telephonic broadcast room to be a listen-only room such that new attendees cannot speak in the first telephonic broadcast room;

command at least one of the online conference platform and the telephonic conference platform to forward audio from the integrated main conference room to the first telephonic broadcast room such that attendees of the first telephonic broadcast room can hear audio of the integrated main conference room;

monitor the telephonic conference platform to determine whether a number of attendees within the first telephonic broadcast room exceeds a predetermined threshold;

when determining that the first telephonic broadcast room exceeds the predetermined threshold, command the telephonic conference platform to create a second telephonic broadcast conference room associated with the meeting;

command the telephonic conference platform to configure the second telephonic broadcast room to be a listen-only room such that new attendees cannot speak in the second telephonic broadcast room;

command at least one of the online conference platform and the telephonic conference platform to forward audio from the integrated main conference room to the second telephonic broadcast room such that attendees of the second telephonic broadcast room can hear audio of the integrated main conference room; and command the telephonic conference platform to redirect a first room code corresponding to the first telephonic broadcast room to a second room code corresponding to the second telephonic broadcast room, whereby subsequent telephonic attendees who input the first room code will be caused to join the second telephonic broadcast room instead of the first telephonic broadcast room.

5. The controller of claim 1, wherein the one or more processors are further configured to tabulate votes made by attendees during the meeting at least by accumulating first votes received from the telephonic conference platform corresponding to first attendees that joined the meeting via the telephonic conference platform and second votes received by a webserver of the controller corresponding to second attendees that joined the meeting via the controller.

6. The controller of claim 4, wherein the one or more processors are further configured to tabulate votes made by attendees during the meeting at least by accumulating first votes received from the telephonic conference platform corresponding to first attendees that joined the meeting via the telephonic conference platform and second votes received by a webserver of the controller corresponding to second attendees that joined the meeting via the controller.

7. A controller of a virtual conferencing system, the controller comprising:

one or more storage devices storing therein a plurality of software instructions;

one or more communications interfaces coupled to an online conference platform and a telephonic conference platform; and one or more processors coupled to the one or more storage devices and the one or more communications interfaces;

wherein, by the one or more processors executing the software instructions loaded from the one or more storage devices, the one or more processors are configured to:

command the online conference platform to create an online main conference room associated with a meeting;

command the telephonic conference platform to create a telephonic main conference room associated with the meeting;

command at least one of the online conference platform and the telephonic conference platform to join the online main conference room and the telephonic main conference room together such that audio in the online main conference room is passed to the telephonic main conference room and vice versa; wherein the online main conference room and the telephonic main conference room joined together form an integrated main conference room;

initiate a livestream of the online main conference room available at a first network address, the livestream including audio and video of the online main conference room;

provide a webserver to which a plurality of online meeting participants may connect to join the meeting;

transmit a first webpage from the webserver to an online meeting participant;

include a first element in the first webpage that has a source address corresponding to the first network address of the livestream thereby causing the livestream to play when the first webpage is rendered by a browser application running on a computing device of the online meeting participant; and include one or more user interface (UI) controls in the first webpage allowing the online meeting participant to interact with the webserver.

8. The controller of claim 7, wherein the one or more processors are further configured to:

command the online conference platform to create an online screener room associated with the meeting;

command the telephonic conference platform to create a telephonic screener room associated with the meeting; and command at least one of the online conference platform and the telephonic conference platform to join the online screener room and the telephonic screener room together such that audio in the online screener room is passed to the telephonic screener room and vice versa; wherein the online screener room and the telephonic screener room joined together form an integrated screener room.

9. The controller of claim 8, wherein the one or more processors are further configured to:

receive from the webserver a message that the online meeting participant has interacted with the user interface (UI) controls on the first webpage thereby indicating the online meeting participant has a question to ask during the meeting;

determine whether there is a screener available to screen the online meeting participant;

when determining that there is the screener available to screen the online meeting participant, add the online meeting participant to the online screener room;

receive a second network address corresponding to the online meeting participant in the screener room from the online conference platform;

transmit a second webpage from the webserver to the online meeting participant; and include in the second webpage an element having a source address corresponding to the second network address of the online meeting participant in the screener room from the online conference platform thereby causing an online screener room user interface (UI) for the online meeting participant on the online conference platform to execute by the browser application running on the computing device of the online meeting participant.

10. The controller of claim 9, wherein the one or more processors are further configured to:

receive from the telephonic conference platform a message that a telephonic meeting participant in the first telephonic broadcast room has pressed one or more touch tones thereby indicating that the telephonic meeting participant has a question to ask during the meeting;

determine whether there is a screener available to screen the telephonic meeting participant; and when determining that there is the screener available to screen the telephonic meeting participant, command the telephonic conference platform to move the telephonic meeting participant from the first broadcast room to the telephonic screener room.

11. The controller of claim 8, wherein the one or more processors are further configured to:
   detect that a screener user for the meeting has logged in to the webserver;
   command the online conference platform to create an online screener user and add the online screener user to the online screener room;
   receive a third network address corresponding to the online screener user in the screener room from the online conference platform;
   transmit a third webpage to a computing device operated by the screener user;
   include an element in the third webpage that has a source address corresponding to the third network address of the online screener user in the screener room from the online conference platform thereby causing an online screener room user interface (UI) for the online screener user to execute by a browser application running on a computing device of the screener user; and
   include one or more user interface (UI) controls in the third webpage allowing the screener user to interact with the webserver to indicate their availability to screen meeting participants with questions.

12. The controller of claim 11, wherein the one or more user interface (UI) controls in the third webpage includes a button to indicate to the webserver that the screener user is available for screening a meeting participant.

13. The controller of claim 11, wherein:
   the one or more user interface (UI) controls in the third webpage includes a list of meeting participants that have unscreened questions; and
   the list of meeting participants includes both telephonic participants that have joined the meeting via the telephonic conference platform and online participants that have joined the meeting via the online conference platform.

14. The controller of claim 13, wherein the one or more user interface (UI) controls in the third webpage allow the screener user to select one of the meeting participants on the list for screening.

15. The controller of claim 7, wherein the one or more processors are further configured to:
   command the online conference platform to create a plurality of online screener rooms associated with the meeting;
   command the telephonic conference platform to create a corresponding plurality of telephonic screener room associated with the meeting; and
   for each pair of online screen room and corresponding telephonic room, command at least one of the online conference platform and the telephonic conference platform to join the online screener room and the corresponding telephonic screener room together such that audio in the online screener room is passed to the corresponding telephonic screener room and vice versa; wherein the online screener room and the corresponding telephonic screener room joined together form an integrated screener room.

16. The controller of claim 7, wherein the one or more processors are further configured to:
   receive from the webserver a message from a moderator user to move a particular online meeting participant to the integrated main conference room to ask a question;
   command the online conference platform to add the particular online meeting participant to the online main conference room;
   receive a fourth network address corresponding to the particular online meeting participant in the online main conference room from the online conference platform;
   transmit a fourth webpage from the webserver to the online meeting participant; and
   include in the fourth webpage an element having a source address corresponding to the fourth network address of the particular online meeting participant in the online main conference room thereby causing an online main conference room user interface (UI) for the particular online meeting participant to execute by the browser application running on the computing device of the online meeting participant.

17. The controller of claim 16, wherein the one or more processors are further configured to:
   receive from the webserver a message from the moderator user to move a particular telephonic meeting participant to the integrated main conference room to ask a question; and
   command the telephonic conference platform to move the telephonic meeting participant from the first broadcast room to the telephonic main conference room.

18. The controller of claim 16, wherein the one or more processors are further configured to:
   detect that the moderator user for the meeting has logged in to the webserver;
   transmit a fifth webpage to a computing device operated by the moderator user; and
   include in the fifth webpage one or more user interface (UI) controls at least including a list of meeting participants that have screened questions;
   wherein the list of meeting participants that have screened questions includes both telephonic participants that have joined the meeting via the telephonic conference platform and online participants that have joined the meeting via the online conference platform.

19. The controller of claim 7, wherein the one or more processors are further configured to tabulate votes made by attendees during the meeting at least by accumulating first votes received from the telephonic conference platform corresponding to first attendees that joined the meeting via the telephonic conference platform and second votes received by the webserver of the controller corresponding to second attendees that joined the meeting via the controller.

20. A controller of a virtual conferencing system, the controller comprising:
   one or more storage devices storing therein a plurality of software instructions;
   one or more communications interfaces coupled to an online conference platform and a telephonic conference platform; and
   one or more processors coupled to the one or more storage devices and the one or more communications interfaces;
   wherein, by the one or more processors executing the software instructions loaded from the one or more storage devices, the one or more processors are configured to:
      command the online conference platform to create an online main conference room associated with a meeting;

command the telephonic conference platform to create a telephonic main conference room associated with the meeting;

command at least one of the online conference platform and the telephonic conference platform to join the online main conference room and the telephonic main conference room together such that audio in the online main conference room is passed to the telephonic main conference room and vice versa; wherein the online main conference room and the telephonic main conference room joined together form an integrated main conference room; and tabulate votes made by attendees during the meeting at least by accumulating first votes received from the telephonic conference platform corresponding to first attendees that joined the meeting via the telephonic conference platform and second votes received by a webserver of the controller corresponding to second attendees that joined the meeting via the controller.

* * * * *